US008526064B2

(12) United States Patent
Harada et al.

(10) Patent No.: US 8,526,064 B2
(45) Date of Patent: Sep. 3, 2013

(54) COMPUTER READABLE STORAGE MEDIUM STORING A PROGRAM, IMAGE PROCESSING APPARATUS AND IMAGE PROCESSING METHOD FOR CREATING A TINT BLOCK IMAGE

(75) Inventors: Seiji Harada, Hino (JP); Rei Yokoyama, Suginami-ku (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 251 days.

(21) Appl. No.: 12/951,290

(22) Filed: Nov. 22, 2010

(65) Prior Publication Data

US 2011/0122453 A1   May 26, 2011

(30) Foreign Application Priority Data

Nov. 25, 2009   (JP) ................................. 2009-267002

(51) Int. Cl.
*H04N 1/40* (2006.01)
*G06K 15/02* (2006.01)
*H04N 1/32* (2006.01)
*G06F 21/60* (2013.01)

(52) U.S. Cl.
CPC .......... *H04N 1/32144* (2013.01); *G06F 21/608* (2013.01)
USPC ....................................... 358/3.28; 358/1.14

(58) Field of Classification Search
USPC ................. 358/1.14, 3.28; 382/100; 283/72, 283/113, 902; 399/366; 235/375, 494
See application file for complete search history.

(56) References Cited

U.S. PATENT DOCUMENTS

| 7,168,868 | B2 * | 1/2007 | Uchida et al. ................ 358/3.28 |
| 7,880,906 | B2 * | 2/2011 | Fusayuki ..................... 358/1.14 |
| 7,894,092 | B2 * | 2/2011 | Kasai et al. .................. 358/1.15 |
| 8,174,733 | B2 * | 5/2012 | Kobayashi ................... 358/3.28 |
| 2004/0051885 | A1 * | 3/2004 | Matsunoshita ............. 358/3.28 |
| 2007/0171480 | A1 * | 7/2007 | Matsunoshita ............. 358/3.28 |
| 2009/0147316 | A1 * | 6/2009 | Kaneda ....................... 358/3.28 |
| 2009/0279144 | A1 * | 11/2009 | Ikusawa ...................... 358/3.28 |
| 2011/0176177 | A1 * | 7/2011 | Uchida et al. ............... 358/3.28 |

FOREIGN PATENT DOCUMENTS

| JP | 2006-119735 A | 5/2006 |
| JP | 2009-124749 A | 6/2009 |

OTHER PUBLICATIONS

Office Action from the Japan Patent Office dated Mar. 5, 2013, issued in corresponding Japanese Patent Application No. 2009-267002, with an English translation thereof.

* cited by examiner

*Primary Examiner* — Scott A Rogers
(74) *Attorney, Agent, or Firm* — Buchanan Ingersoll & Rooney PC

(57) ABSTRACT

Disclosed is a computer readable storage medium storing a program to make a computer realize functions of an image storage unit to store image data for generating a tint block image, a tint block image generation unit to generate the tint block image based on the image data, a script generation unit to generate a script for forming the tint block image based on the tint block image generated by the generation unit, a script adding unit to add the script to print data and a print data input unit to input the print data in which the script is added by the adding unit to an image forming apparatus.

11 Claims, 25 Drawing Sheets

```
%StartJob
Copy = 2
PaperSize = 4
PapeType = Normal
...
%StartPDL
$ Header
$ StartPage
/ Text 8, 12, "Confidential"
/Line(0, 0), 100, ...
...
$EndPage
$StartPage
...
$EndPage
...
%EndPDL
%EndJob
```

30 { (bracket enclosing %StartPDL through %EndPDL)

FIG.14

```
%StartJob
Copy = 2
PaperSize = 4
PapeType = Normal
...
%StartPDL
$ Header
#define CopyProtectImage <
Image 2bit, 32, 64, ...
"FF FF FF FF FF FF FF FF ...
FF 7F FF 7F FF 7F FF 7F ...
...
FF FF FF FF FF FF FF FF ...">
$ StartPage
/CopyProtectImage Repeat
/ Text 8, 12, "Confidential"
/Line(0, 0), 100, ...
...
$EndPage
$StartPage
/CopyProtectImage Repeat
...
$EndPage
...
%EndPDL
%EndJob
```

30 encompasses the PDL block; 35 encompasses the CopyProtectImage definition.

FIG.20

```
%StartJob
Copy = 2
PaperSize = 4
PapeType = Normal
...
%StartPDL
$ Header
$ StartPage
/Image 2bit, 32, 64, ...
"FF FF FF FF FF FF FF FF ...
FF 7F FF 7F FF 7F FF 7F ...
...
FF FF FF FF FF FF FF FF ..." Repeat
/ Text 8, 12, "Confidential"
/Line(0, 0), 100, ...
...
$EndPage
$StartPage
/Image 2bit, 32, 64, ...
"FF FF FF FF FF FF FF FF ...
FF 7F FF 7F FF 7F FF 7F ...
...
FF FF FF FF FF FF FF FF ..." Repeat
...
$EndPage
...
%EndPDL
%EndJob
```

30 { (bracketing %StartPDL through %EndPDL)

FIG.23

```
%StartJob
Copy = 2
PaperSize = 4
PapeType = Normal
...
40 { RGBGrayTreatment = BlackAndGray
     RGBIntent = Vivid
...
     %StartPDL
     $ Header
     #define CopyProtectImage <
35 { Image 2bit, 32, 64, ...
     "FF FF FF FF FF FF FF FF ...
     FF 7F FF 7F FF 7F FF 7F ...
     ...
     FF FF FF FF FF FF FF FF ..." >
     $ StartPage
30 { /CopyProtectImage Repeat
     / Text 8, 12, "Confidential"
     /Line(0, 0), 100, ...
     ...
     $EndPage
     $StartPage
     /CopyProtectImage Repeat
     ...
     $EndPage
     ...
     %EndPDL
     %EndJob
```

COMPUTER READABLE STORAGE MEDIUM STORING A PROGRAM, IMAGE PROCESSING APPARATUS AND IMAGE PROCESSING METHOD FOR CREATING A TINT BLOCK IMAGE

BACKGROUND OF THE INVENTION

1. Field of the Invention

The present invention relates to a computer readable storage medium storing a program, an image processing apparatus and an image processing method.

2. Description of Related Art

In recent years, due to heightening of security consciousness, approaches for preventing images of paper documents from being copied unauthorizingly are carried out and various techniques and methods of such approaches are being developed. Here, "copy" means duplication in which an image of a paper document is read by an optical processing to form a similar image on other paper after digitalizing the read image. This definition applies in the description hereinafter.

As a method for preventing images of paper documents from being copied unauthorizingly, there is a method of creating a paper document in which a tint block image is embedded by providing a tint block print function in an image forming apparatus which forms the images on papers.

Here, the tint block image is an image which is expressed by a collection of dots by using dots having at least two types of sizes. The tint block image is embedded in a document image so as not to be recognized by naked eyes or so as to be difficult to recognize visually. However, when the document image is copied, a portion of the dots are lost or emphasized after copying of the image due to the relation between resolution level of the image reading device and the size of the dots. In such way, the tint block image is manifested as a pattern which can be visually recognized clearly. For example, an image in which a letter string such as "duplication", "copy" or the like is formed is suggested as such pattern image. When a user sees a paper in which an image including the above pattern image is formed, he/she can easily determine that the image is formed by copying.

Generally, the tint block print function is realized by using a dedicated hardware (for example, a dedicated chip), and the hardware for the tint block print function is pre-provided in an image forming apparatus as shown in JP2006-119735, for example. The image forming apparatus in which the hardware dedicated for the tint block print function is provided is expensive comparing to an image forming apparatus without the tint block print function. Therefore, the tint block print function has been a function to be loaded to image forming apparatuses and multi functional printers of high-end which are relatively expensive.

Meanwhile, in recent years, image forming apparatuses and multi functional printers which are not provided with the tint block print function by the dedicated hardware (hereinafter, described as "low-cost machine") which are inexpensive comparing to the above image forming apparatuses of high-end are prevailing. At the same time, there are market needs for a low-cost machine provided with the tint block print function.

However, when the tint block print function by a dedicated hardware is to be provided to the low-cost machine, there are problems that the cost will be expensive and that the cost advantage of the low-cost machine reduces or disappears.

SUMMARY OF THE INVENTION

In view of the above problems, an object of the present invention is to carry out the tint block printing at a low cost.

In order to achieve at least one of the above-mentioned object, a computer readable storage medium storing a program reflecting one aspect of the present invention makes a computer realize functions of an image storage unit to store image data for generating a tint block image, a tint block image generation unit to generate the tint block image based on the image data, a script generation unit to generate a script for forming the tint block image based on the tint block image generated by the generation unit, a script adding unit to add the script to print data and a print data input unit to input the print data in which the script is added by the adding unit to an image forming apparatus.

Preferably, the above computer readable storage medium storing the program makes the computer realize functions of a defining unit to define the script for forming the tint block image as an object and a command adding unit to add an invoking command for invoking the object which is defined by the defining unit to each page of the print data.

Preferably, in the above computer readable storage medium storing the program, the tint block image comprises a remaining pattern which is visually recognizable in an image which is copied when a copying by an optical processing is carried out to the tint block image formed on a paper and a disappearing pattern which is not visually recognizable in the image which is copied when the copying by the optical processing is carried out to the tint block image formed on the paper.

Preferably, the above computer readable storage medium storing the program makes the computer realize functions of a letter string input unit to input a letter string formed of one or a plurality of letters, a letter string image generation unit to generate a letter string image according to the letter string and a tint block image generation unit to generate the tint block image based on the letter string image and the image data.

Preferably, the above computer readable storage medium storing the program makes the computer realize a function of a second setting unit to set a color of the tint block image.

Preferably, in the computer readable storage medium storing the program, the script is a page description language.

BRIEF DESCRIPTION OF THE DRAWINGS

The present invention will become more fully understood from the detailed description given hereinbelow and the appended drawings, and thus are not intended as a definition of the limits of the present invention, and wherein:

FIG. 5 is an example of a letter string image;

FIG. 13 is an example of page description data;

FIG. 14 is an example of the page description data including a tint block image definition;

FIG. 20 is an example of page description data when a script for forming the tint block image is described in each page;

FIG. 23 is an example of a job control description 40 including an image quality setup description;

DESCRIPTION OF THE PREFERRED EMBODIMENTS

Hereinafter, embodiments of the present invention will be described in detail with reference to the drawings.

First, the first embodiment of the present invention will be described.

Figure 1:
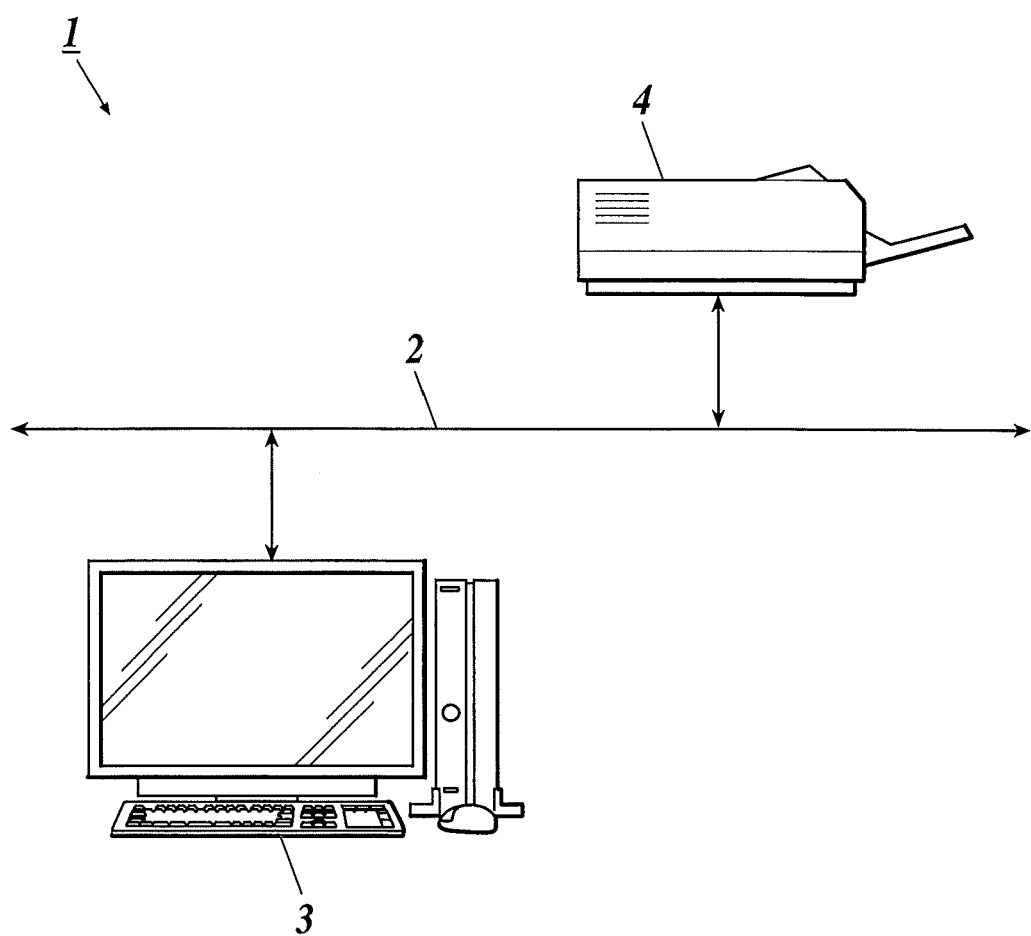
FIG. 1 is a configuration diagram of a network including a computer which operates a program of the present invention.

In FIG. 1, a configuration diagram of a network 1 including a computer 3 which operates a program of the present invention is shown.

As shown in FIG. 1, the network 1 includes the computer 3 and an image forming apparatus 4 which are connected via a circuit 2 so as to communicate with each other.

The computer 3 transmits job data (print job) for forming an image on a paper by the image forming apparatus 4 to the image forming apparatus 4 via the circuit 2. The print job includes image data (print data) corresponding to the image to be formed on the paper. The image forming apparatus 4 forms the image on the paper based on the print job which is transmitted from the computer 3.

The circuit 2 shown in FIG. 1 is a wired circuit. However, the circuit can be a wired form or a wireless form as long as data transmission can be carried out between the computer 3 and the image forming apparatus 4. Further, the computer 3 of the first embodiment transmits data to the image forming apparatus 4 via the circuit 2 of the network 1. However, the data transmission between the computer 3 and the image forming apparatus 4 may be carried out by connecting the computer 3 and the image forming apparatus 4 by a connecting method other than the network. As for the connection other than the network, a connection via RS-232, SCSI, USB or other interfaces, a connection by a dedicated wire or the like are suggested, for example.

Figure 2:
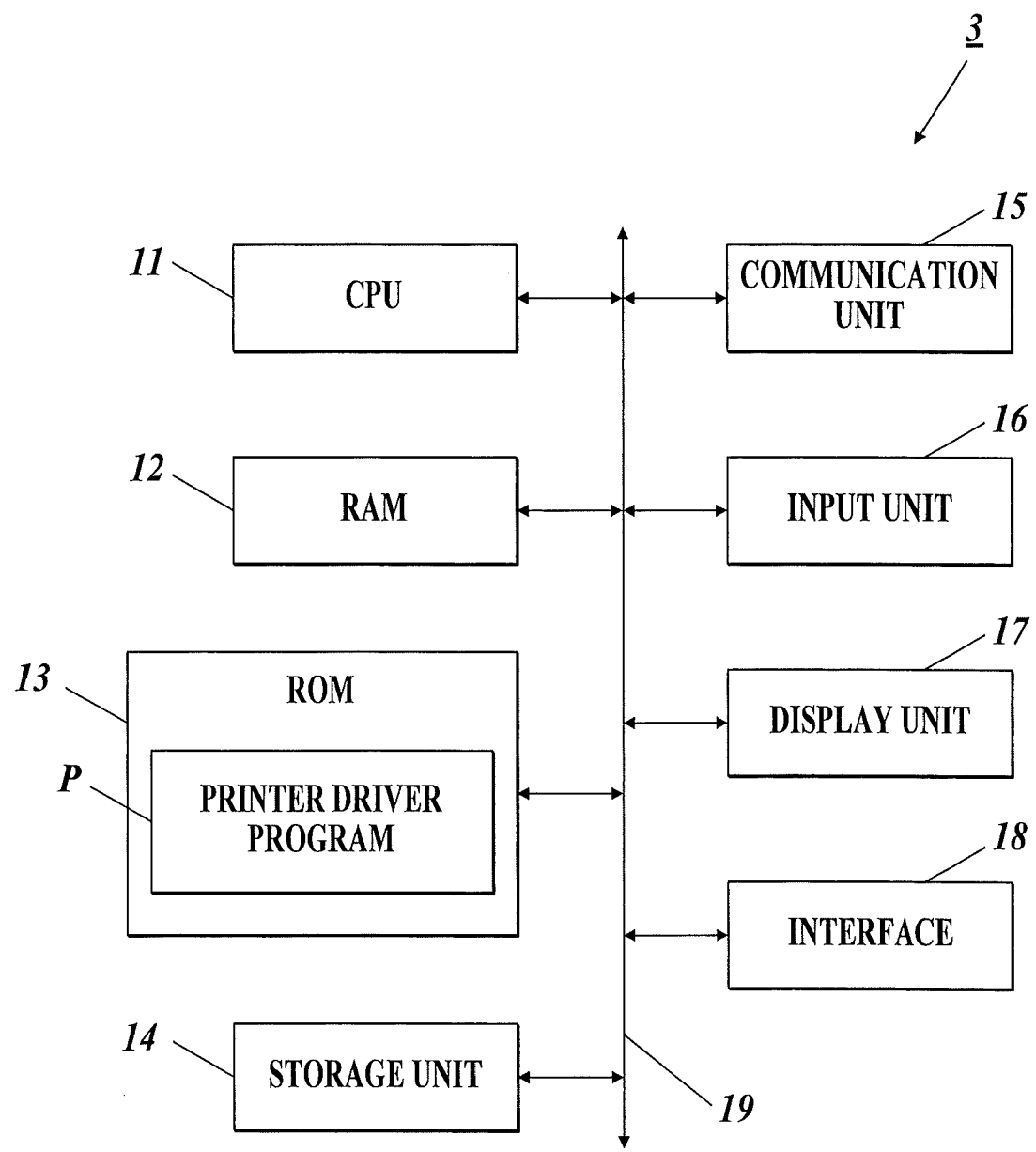
FIG. 2 is a block diagram of the computer.

In FIG. 2, a block diagram of the computer 3 is shown.

The computer 3 includes a CPU 11, a RAM 12, a ROM 13, a storage unit 14, a communication unit 15, an input unit 16, a display unit 17 and an interface 18. Each part of the computer 3 is connected by a bus 19.

The CPU 11 carries out various types of processes including an operation control of the computer 3 by reading out a program, data and the like according to a processing content from the ROM 13, the storage unit 14 and the like and by carrying out execution processes.

The RAM 12 is a storage device for storing the programs, data and the like which are read out by the CPU 11 and parameters generated by the processes carried out by the CPU 11.

The ROM 13 is a storage device for storing the programs, data and the like to be read out by the CPU 11 so as not to be rewritable.

The storage unit 14 is a storage device which can store the programs, data and the like which are to be read out by the CPU 11 so as to be rewritable and also can store data generated by processes carried out by the CPU 11 and programs, data and the like inputted from outside. The storage unit 14 is structured with a flash memory, a hard disk drive, other rewritable storage device or combinations thereof, for example.

The communication unit 15 carries out communication with an external device. In the first embodiment, data is transmitted to the image forming apparatus 4 via the communication unit 15 and the circuit 2. Receiving and sending of data by the communication unit 15 is not limited to be carried out with the image forming apparatus 4 and can be carried out with other devices.

The input unit 16 is an input device for carrying out various types of input to the computer 3. The input unit 16 of the first embodiment includes an input device such as a key board, a mouse and the like and carries out various types of input to the computer 3 according to the contents of input operation by a user. The input unit 16 may include a structure to receive input operation by other devices and methods. For example, input of letters by a pen, input by a touch panel form input device, combinations of either one or a plurality of the above and the input by key board, mouse and the like are suggested, for example.

The display unit 17 carries out various types of display output associated with the process of the computer 3.

The interface 18 connects an external device to the computer 3, and the interface 18 is an interface which allows data transmission between the computer 3 and the external device. The interface 18 is a RS-232, a SCSI, a USB or other interface, for example, and is subjected to be replaced by any kind of interface which is to be invented in the future.

When inputting print data to the image forming apparatus 4 from the computer 3, the CPU 11 of the computer 3 obtains a printer driver function by carrying out the execution process by reading out the printer driver program P from the ROM 13. The printer driver program P is a printer driver program corresponding to the type and function of the image forming apparatus 4. Hereinafter, the computer 3 which obtains the printer driver function is simply described as "printer driver". The process carried out by the printer driver is a process carried out by the CPU 11 controlling the operation of each part of the computer 3.

The printer driver carries out a process of generating print data based on original image data corresponding to the image to be formed on a paper and outputting the generated print data to the image forming apparatus 4. The original image data may be stored in the storage unit 14, may be inputted via the interface 18 or may be read out from an external device which is connected via the circuit 2.

Figure 3:
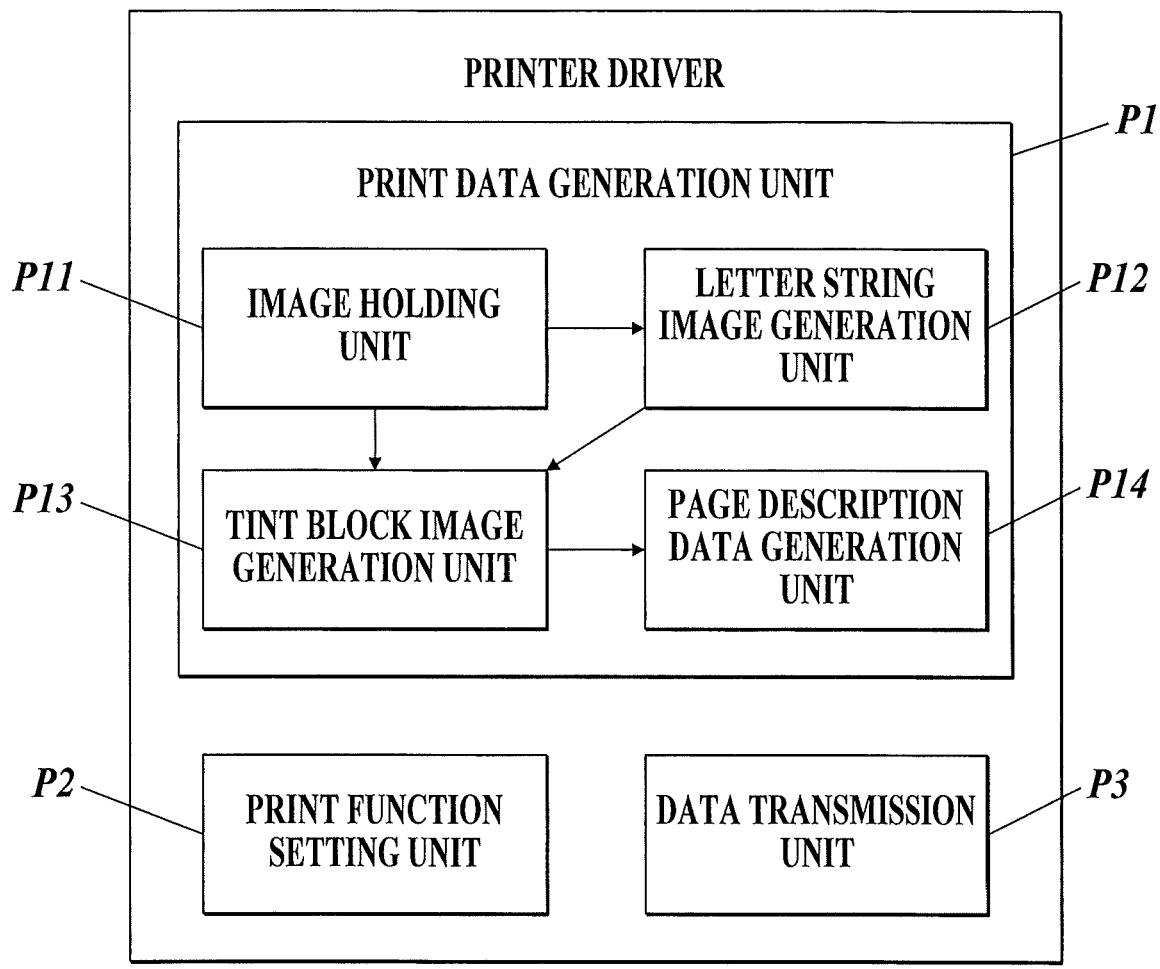
FIG. 3 shows a functional block diagram of a printer driver.

In FIG. 3, a functional block diagram of the printer driver is shown.

The printer driver includes a print data generation unit P1, a print function setting unit P2 and a data transmission unit P3.

The print data generation unit P1 includes an image holding unit P11, a letter string image generation unit P12, a tint block image generation unit P13 and a page description data generation unit P14.

The image holding unit P11 holds pattern image data for generating a tint block image.

Figure 4:
FIG. 4 is an example of a design to be formed by pattern image data.

In FIG. 4, an example of a design to be formed by the pattern image data is shown.

The pattern image data is image data which can form a continuous pattern design by adjacently arranging a plurality of images which are formed by the image data as in the arabesque design pattern shown in FIG. 4, for example. By forming a tint block image by using a continuous pattern design, there is a camouflage effect where the tint block image formed on the paper is difficult to be recognized.

In the first embodiment, the pattern image data is stored in the storage unit 14 and the image holding unit P11 manages and holds the image pattern stored in the storage unit 14.

The letter string image generation unit P12 generates letter string image data based on a letter string inputted via the input unit 16. The letter string image data is image data for forming a letter string image. The letter string image is an image having a figuration according to one or a plurality of an arbitrary letter string which is inputted via the input unit 16.

In FIG. 5, an example of the letter string image is shown.

FIG. 5 is a letter string image corresponding to two letters of the characters shown in FIG. 5. In the first embodiment, the generated letter string image is held by the image holding unit P11.

The generation of letter string image by the letter string image generation unit P12 is carried out one letter at a time. When generating a tint block image corresponding to a letter string of a plurality of letters, the letter string image generation unit P12 generates the letter string image one letter at a time in order from the first letter that structures the letter string. Then, the letter string image generation unit P12 combines the second letter and the letters thereafter so that each letter be adjacent to the letter just before to generate the letter string image corresponding to the letter string.

In the case of an example shown in FIG. 5, first, a letter string image will be generated for the first character (the character shown in left). Thereafter, a letter string image will be generated for the second character (the character shown in right) which is a character following the first character, and the letter string image of the second character is to be combined so as to be adjacent in the right side of the letter string image of the first character.

The tint block image generation unit P13 generates tint block image data based on the pattern image data and the letter string image data. The tint block image data is image data for forming a tint block image.

Figure 6:
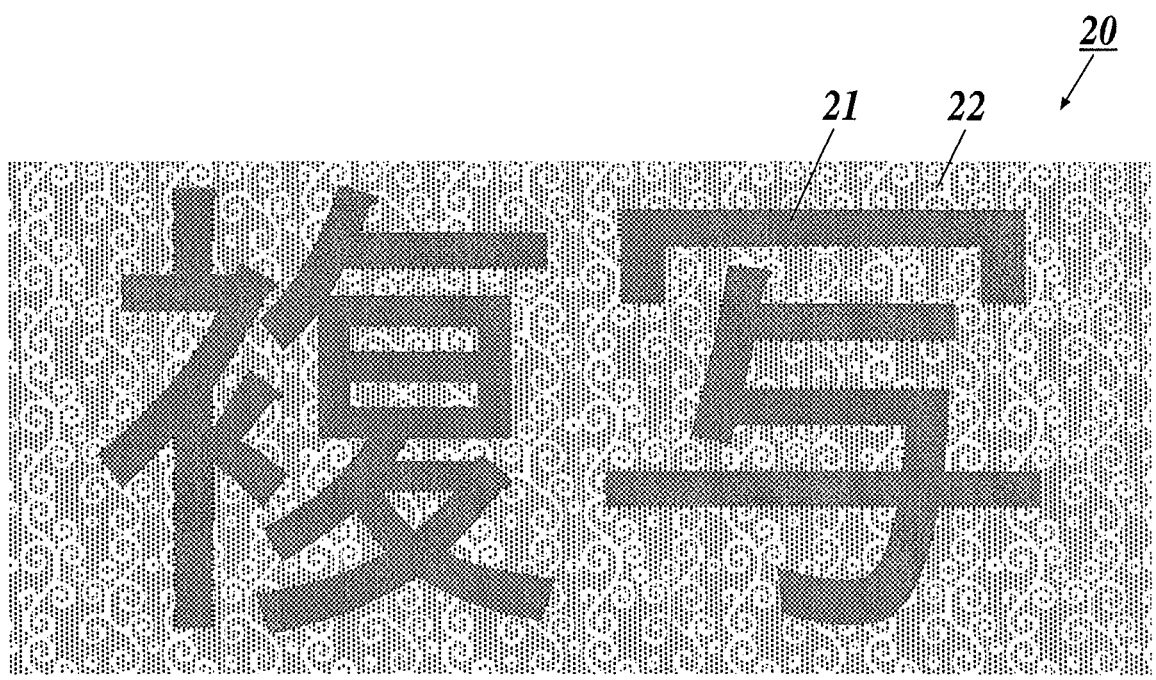
FIG. 6 is an example of a tint block image.

In FIG. 6, the tint block image 20 is shown as an example of a tint block image.

Figure 7:
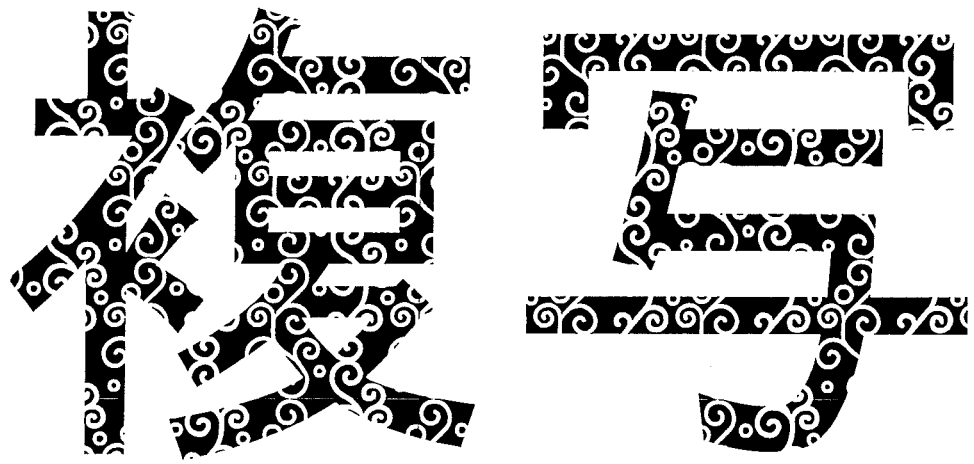
FIG. 7 is an example of an image to be formed on a paper after copying when an image of a paper in which the tint block image shown in FIG. 6 is formed is copied.

In FIG. 7, an example of an image to be formed on a paper after copying when an image on a paper in which the tint block image 20 shown in FIG. 6 is formed is copied.

As shown in FIG. 6, the tint block image 20 includes a remaining pattern 20 and a disappearing pattern 22. The remaining pattern is one of the patterns included in the tint block image and is a dot pattern that appears as a visually recognizable image in the image which is to be forming on a paper after copying when the tint block image is copied. The disappearing pattern is other pattern included in the tint block image and is a dot pattern which cannot be visually recognized in the image to be formed on a paper after copying when the tint block image is copied. Here, in FIG. 6, the remaining pattern 21 and the disappearing pattern 22 are expressed by being emphasized so that they are distinctive. However, in the real tint block image 20, both of the patterns are similar to each other that they cannot be distinguished and the tint block image 20 is recognized as a low-level image where the dots are simply dispersed.

The tint block image 20 shown in FIG. 6 includes the remaining pattern 21 in a figuration corresponding to the two characters thereof and the disappearing pattern 22 formed at the periphery of the remaining pattern. When the tint block image 20 shown in FIG. 6 is copied, the two characters in the pattern design which are formed according to the pattern image data are visualized as shown in FIG. 7 in the image after copying.

Figure 8:
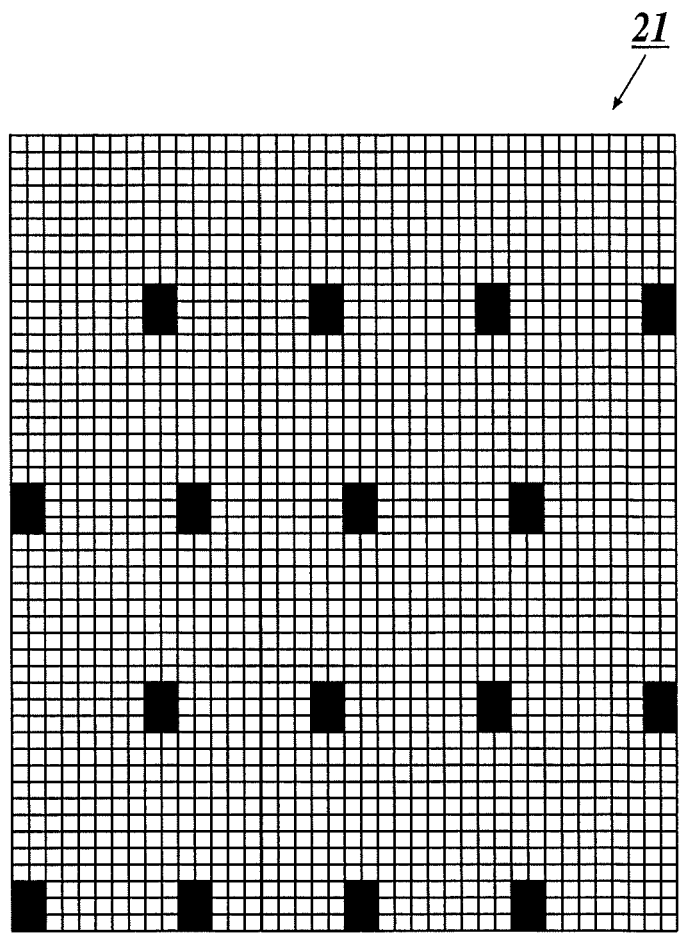
FIG. 8 is an enlarged diagram of a remaining pattern.

In FIG. 8, an enlarged diagram of the remaining pattern 21 is shown.

Figure 9:
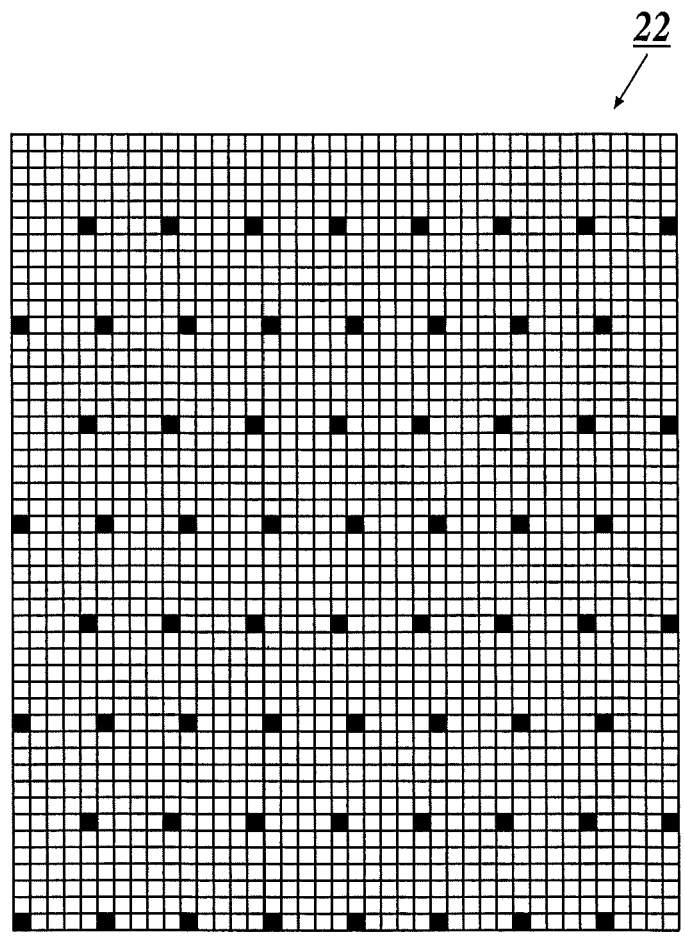
FIG. 9 is an enlarged diagram of a disappearing pattern.

In FIG. 9, an enlarged diagram of the disappearing pattern 22 is shown.

As shown in FIG. 8, as for the remaining pattern 21 of the first embodiment, cells in which total of 6 dots of the adjacent 2×3 dots are set to ON (with color) among a plurality of pixels structuring the image are arranged having a predetermined space therebetween.

As shown in FIG. 9, as for the disappearing pattern 22 of the first embodiment, single dots among the plurality of pixels structuring the image are arranged by having a predetermined space therebetween, the space being different from the space in the remaining pattern 21.

The tint block image of the first embodiment is a binarized image, and the remaining pattern 21 shown in FIG. 8 and the disappearing pattern 22 shown in FIG. 9 are enlarged diagrams of the binarized images. The remaining pattern 21 shown in FIG. 8 and the disappearing pattern 22 shown in FIG. 9 are merely examples and the structures are not limited to what are exemplified as long as remaining/disappearing can be realized in the image after copying.

Each image data for forming the remaining pattern and the disappearing pattern is stored in the storage unit 14 and is managed and held by the image holding unit P11.

Next, a flow of the tint block image generation process will be described by using an example of a case where a letter string stands out as a tint block image after copying.

First, the tint block image generation unit P13 combines the letter string image data generated by the letter string image generation unit P12 and the pattern image data of the image holding unit P11 to generate combined image data. An image to be formed by the combined image data is an image similar to the image shown in FIG. 7.

Next, the tint block image generation unit P13 combines the combined image data and the image data for forming the remaining pattern to generate remaining image data. The remaining image data is image data for forming a remaining image. The remaining image is an image within the tint block image which can be visually recognized in the image after copying.

Figure 10:
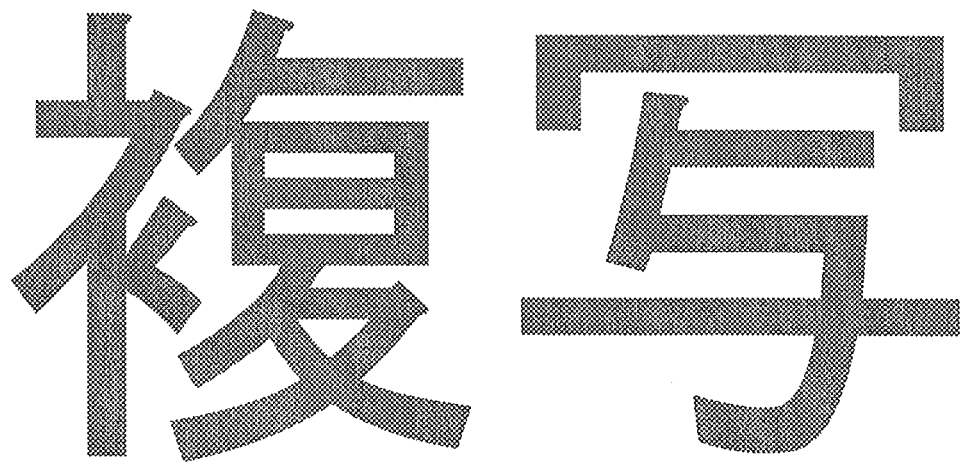
FIG. 10 is an example of a remaining image.

In FIG. 10, an example of the remaining image is shown.

The remaining image shown in FIG. 10 is an image corresponding to the remaining pattern 21 shown in FIG. 6.

Next, the tint block image generation unit P13 generates disappearing image data based on the pattern image data, the image data for forming the disappearing pattern and the letter string image data generated by the letter string image generation unit P12. The disappearing image data is image data for forming a disappearing image. The disappearing image is an image within the tint block image which cannot be visually recognized in the image after copying.

In particular, the tint block image generation unit P13 combines the pattern image data and the image data for forming the disappearing pattern. Further, the tint block image generation unit P13 combines the image data in which the pattern image data and the image data for forming the disappearing pattern are combined and the reversed letter string image data in which the letter string image data is reversed.

Figure 11:
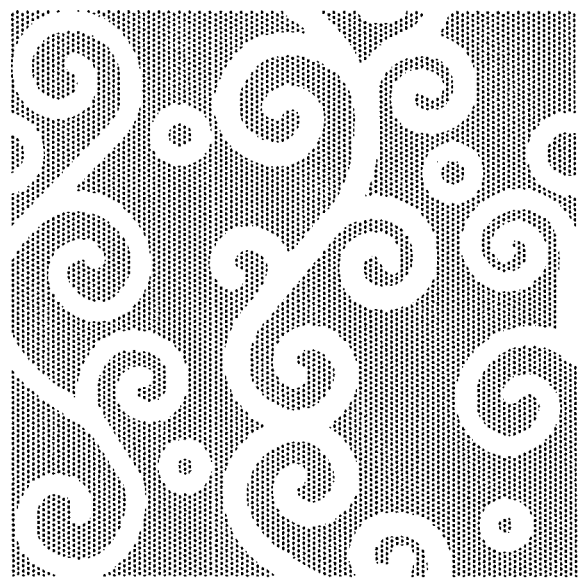
FIG. 11 is an example of a combined result of pattern image data and image data for forming the disappearing pattern.

In FIG. 11, an example of a result where the pattern image data and the image data for forming the disappearing pattern are combined is shown.

Figure 12:
FIG. 12 is an example of reversed letter string image data.

In FIG. 12, an example of the reversed letter string image data is shown.

By combining the pattern image data shown in FIG. 4, the image data for forming the disappearing pattern shown in FIG. 9 and the reversed letter string image data shown in FIG. 12, an image corresponding to the disappearing pattern 22 shown in FIG. 6 is generated.

Then, the tint block image generation unit P13 combines the remaining image and the disappearing image to generate the tint block image. The above described is an example of a case where the letter string stands out as the tint block image after copying. In a case where the portion other than the letter string stands out as the tint block image after copying, the remaining pattern and the disappearing pattern which are combined replace each other.

The page description data generation unit P14 generates a script which can be deciphered by the image forming apparatus 4 based on a print command and image data. The page description data generation unit P14 of the first embodiment generates a script according to the image data by the page description language (hereinafter described as "PDL") and outputs the generated script as the page description data 30. The page description data 30 is transmitted to the image forming apparatus 4 as data structuring the print data. The image forming apparatus 4 carries out image forming according to the description contents of the page description data 30.

In FIG. 13, an example of the page description data 30 is shown.

The page description data 30 is a script that starts from the description of "%StartPDL" and ends with the description of "%EndPDL". Between the description of "%StartPDL" and the description of "%EndPDL", description data corresponding to the image to be formed in each page is included. The description data corresponding to the image to be forming in each page is the portion that starts from the description of "$StartPage" and ends with the description of "$EndPage" which appears first after the description of "$StartPage", and the description starting from "$StartPage" and ending with "$EndPage" is repeated according to the number of pages.

At before and after the page description data 30, a job control description is added. The job control description indicates starting of a print job by the description of "%StartJob" and indicates ending of the print job by the description of "%EndJob". The script of the page description data 30 is positioned between the description of "%StartJob" and the description of "%EndJob" and is included in one print job.

The job control description indicates various types of setting information with regards to the image forming other than start/end of the print job. The various types of setting information with regards to the image forming includes the number of copies to be printed, paper size, paper type and the like, for example. The job control description may be described according to a Printer Job Language (PJL) format, for example.

The page description data generation unit P14 generates the tint block image definition 35 for the print job in which using of tint block image is set and adds the generated tint block image definition 35 to the page description data 30. The tint block image definition 35 is a script for carrying out an object definition for forming the tint block image.

In FIG. 14, an example of the page description data 30 including the tint block image definition 35 is shown.

The tint block image definition 35 is a script that declares the object definition by a predetermined command such as "#define CopyProtectImage" shown in FIG. 14 and that indicates information for rendering the tint block image by the description within a parenthesis (< >) after the command of "#define CopyProtectImage". When forming of the image by the image forming apparatus 4 is carried out according to the description within the parenthesis (< >), the tint block image as shown in FIG. 6, for example, is to be formed.

In case of an example shown in FIG. 14, the tint block image definition 35 is described in the header of the page description data 30. The header of the page description data 30 has a range from the description of "$Header" to the description of "$StartPage" that appears first after the description of "$Header".

Then, the page description data generation unit P14 adds a command for carrying out the forming of the tint block image to the page description data 30. The command for carrying out forming of the tint block image is a predetermined command such as "/CopyProtectImage Repeat" shown in FIG. 14, for example, and the command is a command to invoke the object of the tint block image definition 35 which is defined after "$Header". In the page in which an image is formed by the page description data including the command, the tint block image is to be formed in addition to the image of the page.

In case of the page description data 30 shown in FIG. 14, the command for carrying out the forming of the tint block image is inserted at the top of each page in which the forming of the tint block image is to be carried out. That is, the command for carrying out the forming of the tint block image is inserted more in front than the data portion (script of "/Text8, 12, . . ." shown in FIG. 14) for forming the image other than the tint block image of the page. The contents of the data portion for forming the image other than the tint block image of each page corresponds to the original image data which is attempted to be printer by the print job.

When inserting the command for carrying out the forming of the tint block image at the top of each page in which the forming of the tint block image is carried out as shown in FIG. 14, the tint block image is to be formed in the background side of the image of the page other than the tint block image. In other words, the tint block image is formed on the paper first, and then, the image other than the tint block image of the page is to be formed so as to overlay on the tint block image.

The tint block image can be formed in the foreground side of the image other than the tint block image of the page. In other wards, the image of the page other than the tint block image is formed on the paper first, and then, the tint block image is to be formed so as to overlay on the image other than the tint block image.

The function for carrying out setting with regards to relation between the tint block image and the image of the paper other than the tint block image and other various types of tint block image is provided by the print function setting unit P2.

The print function setting unit P2 displays various types of setup screens such as the print setup screen D1, the tint block editing screen D2 and the like in the display unit 17. Then, the print function setting unit P2 carries out a process to reflect the setting according to input operation with respect to various types of setup screen to the image forming by the image forming apparatus 4.

Figure 15:
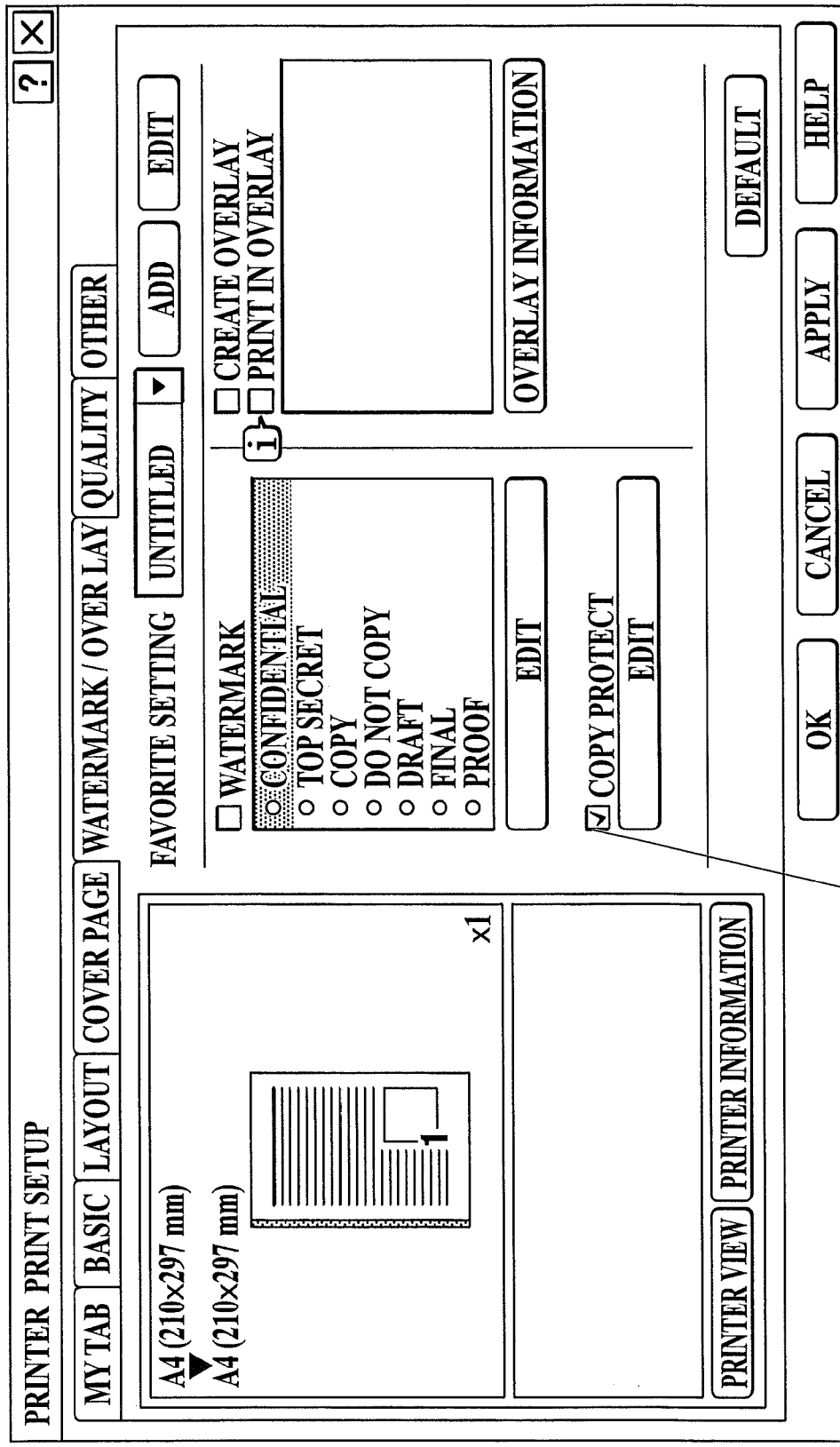
FIG. 15 is an example of a print setup screen.

In FIG. 15, an example of the print setup screen D1 is shown.

In the print setup screen D1 of the first embodiment, a check box C1 for switching ON/OFF of the tint block print function is provided. When the check box C1 of "Copy Protect" shown in FIG. 15 is checked, the tint block print function is turned ON. When the tint block print function is ON, the tint block image definition 35 is added to the page description data 30 and the command for carrying out the forming of the tint block image is inserted to each page. When the check in the check box C1 of "Copy Protect" shown in FIG. 15 is removed, the tint block print function is turned OFF. When the tint block print function is OFF, the tint block image definition 35 is not added to the page description data 30 and the command for carrying out the forming of the tint block image is not inserted to each page.

When the "Edit" button provided below the check box C1 of the "Copy Protect" shown in FIG. 15 is clicked, the tint block editing screen D2 is displayed. The tint block editing screen D2 is an input screen in which various types of setting with regards to the forming of the tint block can be carried out.

Figure 16:
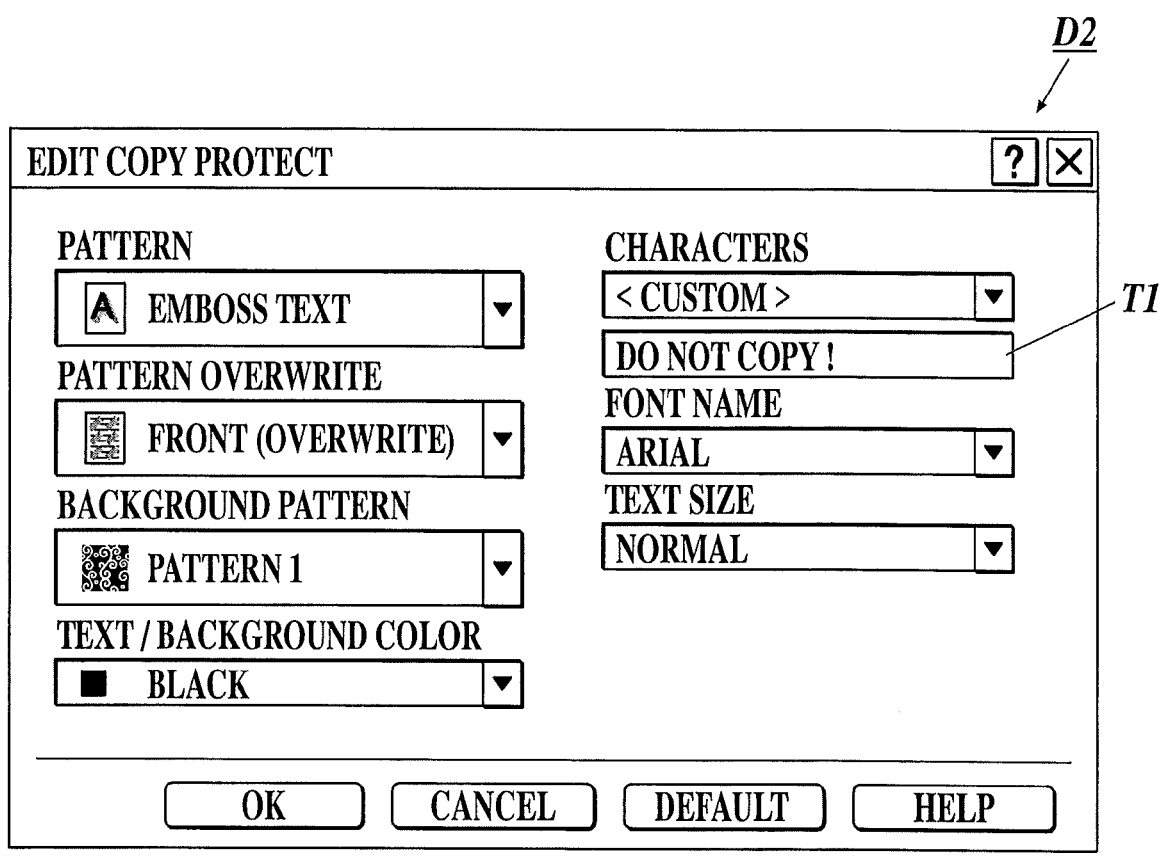
FIG. 16 is an example of a tint block editing screen.

In FIG. 16, an example of the tint block editing screen D2 is shown.

As shown in FIG. 16, the tint block editing screen D2 includes setting items of "Pattern", "Pattern Overwrite", "Background Pattern", "Text/Background Color", "Characters", "Font Name" and "Text Size".

"Pattern" is a setting item relating to the way of the tint block image to be formed in the image after copying is to be expressed. As for "Pattern", either one of "Emboss Text" or "Emboss Background" is to be selected to be set. When "Emboss Text" is selected, the letter string stands out as the tint block image after copying. That is, when "Emboss Text" is selected, the tint block image which is to be formed in the image after copying is the letter string as shown in FIG. 7. When "Emboss Background" is selected, the portion other than the letter string stands out as the tint block image after copying. That is, when "Emboss Background" is selected, the tint block image in which the remaining pattern 21 and the disappearing pattern 22 of the tint block image shown in FIG. 6 replacing each other is generated, and the white-out letter string in which the letter string is graven in the pattern image appears as the tint block image after copying.

"Pattern Overwrite" is a setting relating to overlaying of the tint block image and the image other than the tint block image of each page. As for "Pattern Overwrite", either one of "Front" or "Back" is to be selected to be set. When "Front" is selected, the tint block image is to be formed in the foreground side of the image other than the tint block image of each page. At this time, the command for carrying out the forming of the tint block image which is to be added in the page description data 30 is inserted at the end of each page, that is, at just before the description of "$EndPage" of each page. When "Back" is selected, the tint block image is to be formed in the background side of the image other than the tint block image of each page.

"Background Pattern" is a setting item relating to the pattern image which is used for the tint block image. In the example shown in FIG. 16, the pattern image of arabesque design shown in FIG. 4 as "Pattern 1" is selected to be set. However, a user may set other pattern images.

"Text/Background Color" is a setting item relating to color of the tint block image. As for "Text/Background Color", either one of "Black", "cyan" or "Magenta" is to be selected to be set. Each of "Black", "Cyan" and "Magenta" corresponds to black (K), cyan (C) and magenta (M), respectively, and the tint block image of the color set in "Text/Background Color" is to be formed on the paper.

"Characters" is a setting item relating to the letter string to be formed by the tint block image. As for "Characters", either one of the select item that shows the letter string which is pre-set or the select item of "<Custom>" is to be selected to be set. When the select item showing the pre-set letter string is selected, letter string image data and tint block image data corresponding to the selected pre-set letter string are generated and the pre-set letter string appears as the tint block image. As for the pre-set letter string, for example, "duplicate", "copy" and the like are suggested. However, a user can set an arbitrary letter string as the pre-set letter string. A plurality of select items indicating the pre-set letter strings can be provided. When "<Custom>" is selected, a letter string can be inputted to the text box T1 provided below the setting item of "Characters" and the letter string which is inputted in the text box T1 appears as the tint block image.

"Font Name" is a setting relating to the font of the letters to be formed as the tint block image. As for "Font Name", names of various types of fonts which are adopted in the computer 3 appear as select items and either one of the fonts is to be selected to be set. The figuration of the letters to be formed as the tint block image corresponds to the figuration of the font set in "Font Name".

"Text Size" is a setting relating to size of the letters to be formed as the tint block image. As for "Text Size", either one among a plurality select items for setting the size of the letters to be formed as the tint block image is to be selected to be set. The size of the letters to be formed by the tint block image corresponds to the select item set in "Text Size". In the first embodiment, "small", "normal" and "large" are provided as the select items of "Text Size". However, other select items can be provided.

Similarly, the setting items and select items which can be set in the tint block editing screen D2 are just an example, and the setting items and select items can be changed arbitrarily. The same applies to other setup screens.

The data transmission unit P3 provides a function to transmit the print job including the print data and the data for reflecting the setting contents which are inputted by a user through various types of setup screen in the image forming apparatus 4 to the image forming apparatus 4.

Next, a flow of the process carried out by the printer driver will be described using the flowchart of FIGS. 17 to 19.

Figure 17:
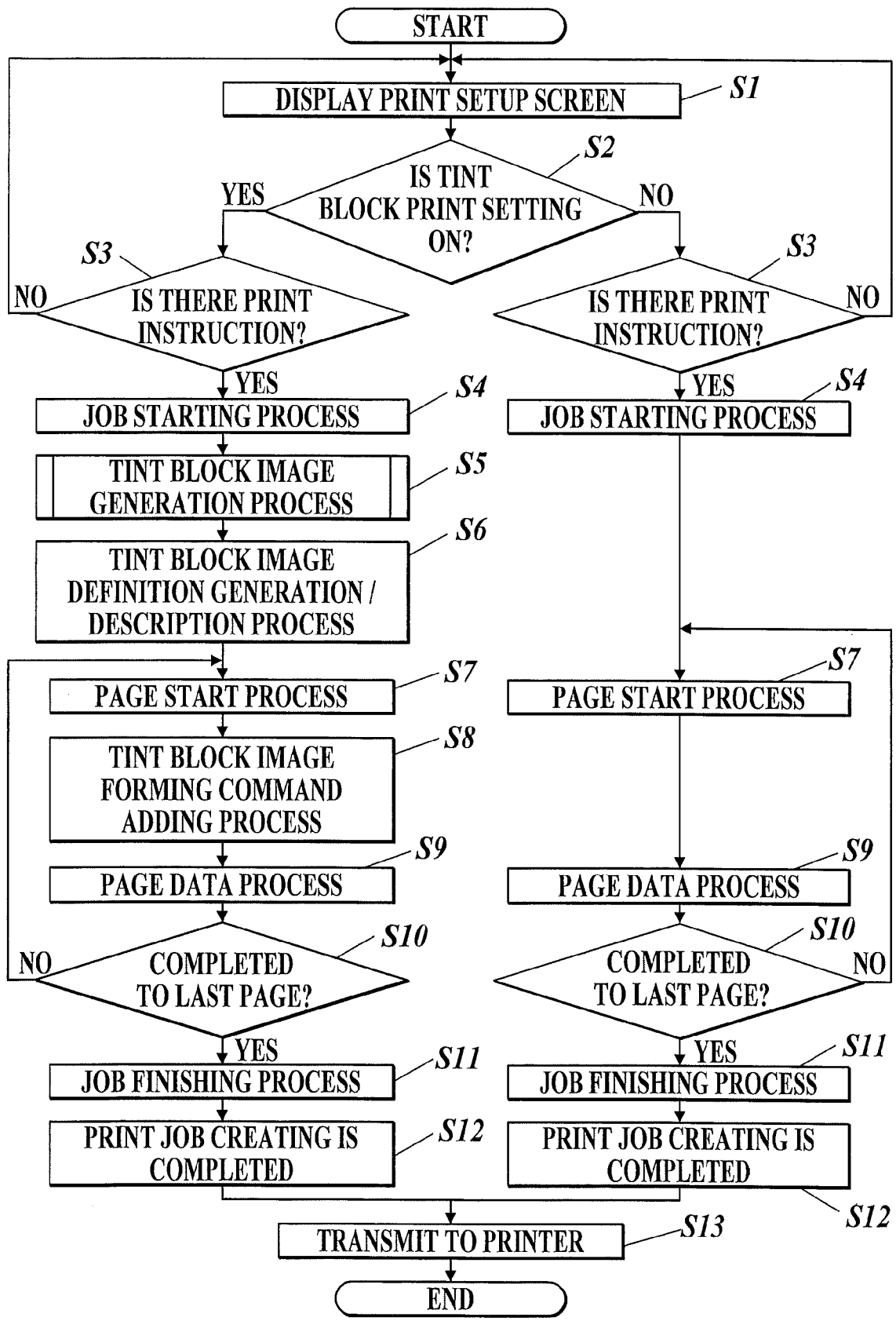
FIG. 17 is a flowchart showing a flow of a process carried out by the printer driver.

In FIG. 17, a flow of the process carried out by the printer driver is shown.

The print function setting unit P2 of the printer driver displays a print setup screen through the display unit 17 (step S1). Here, when the tint block print setting is turned ON by the check box C1 of "Copy Protect" being checked by a user via the input unit 16 (step S2: YES), the tint block image is to be formed in printing thereafter, that is, in the image forming to the papers by the image forming apparatus 4.

When printing is instructed (step S3: YES) in a state where the tint block print setting is ON (step S2: YES), the printer driver carries out the job starting process (step S4). The job starting process is a process where the printer driver declares starting of the print job by the description of "%StartJob" and generates the description up to "$Header" of the page description data 30.

In step S3, when there is no print instruction (step S3: NO), the process returns to step S1.

After the process of step S4, the printer driver carries out the tint block image generation process (step S5).

Figure 18:
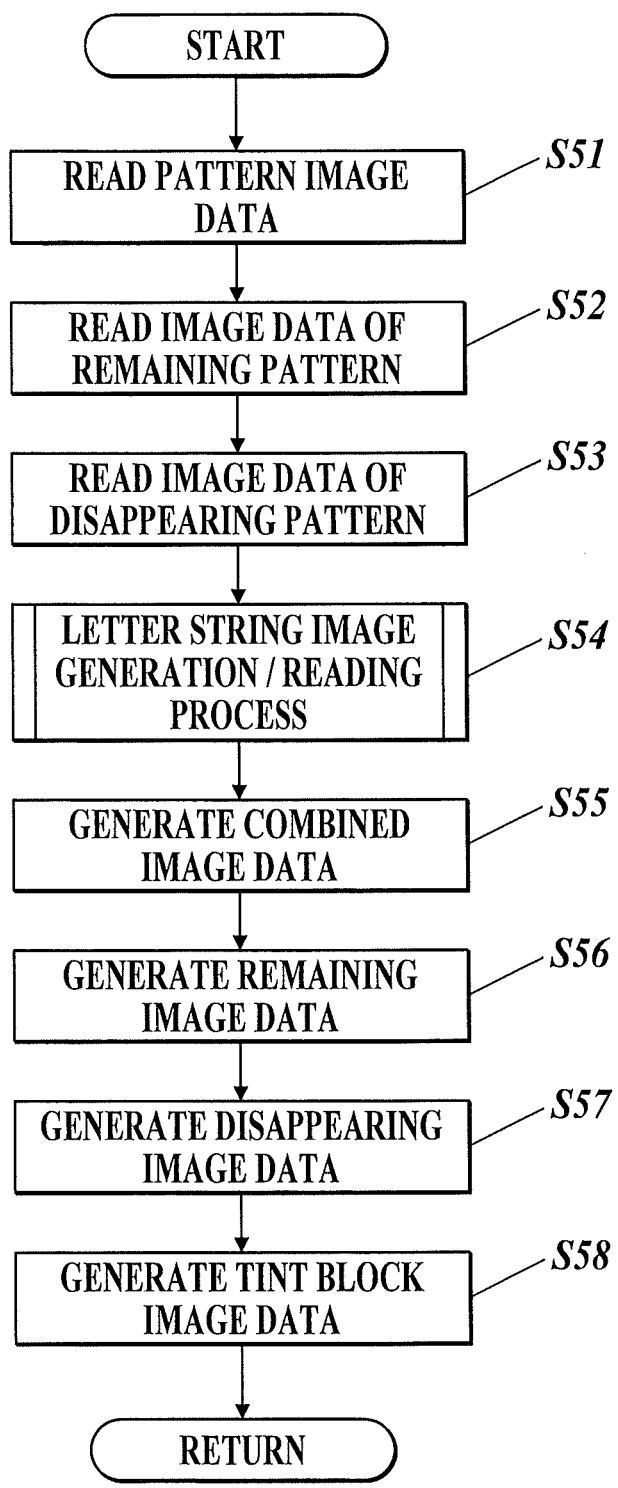
FIG. 18 is a flowchart showing a flow of a tint block image generation process.

In FIG. 18, a flow of the tint block image generation process is shown.

In the tint block image generation process, the tint block image generation unit P13 of the printer driver orderly carries out reading of the pattern image data, the data for structuring the remaining pattern and the data for structuring the disappearing pattern from the image holding unit P11 (step S51 to S53). The order of reading the pattern image data, the data for structuring the remaining pattern and the data for structuring the disappearing pattern shown in steps S51 to S53 is a random order and can be changed arbitrarily.

Next, the printer driver carries out the letter string image generation/reading process (step S54).

Figure 19:
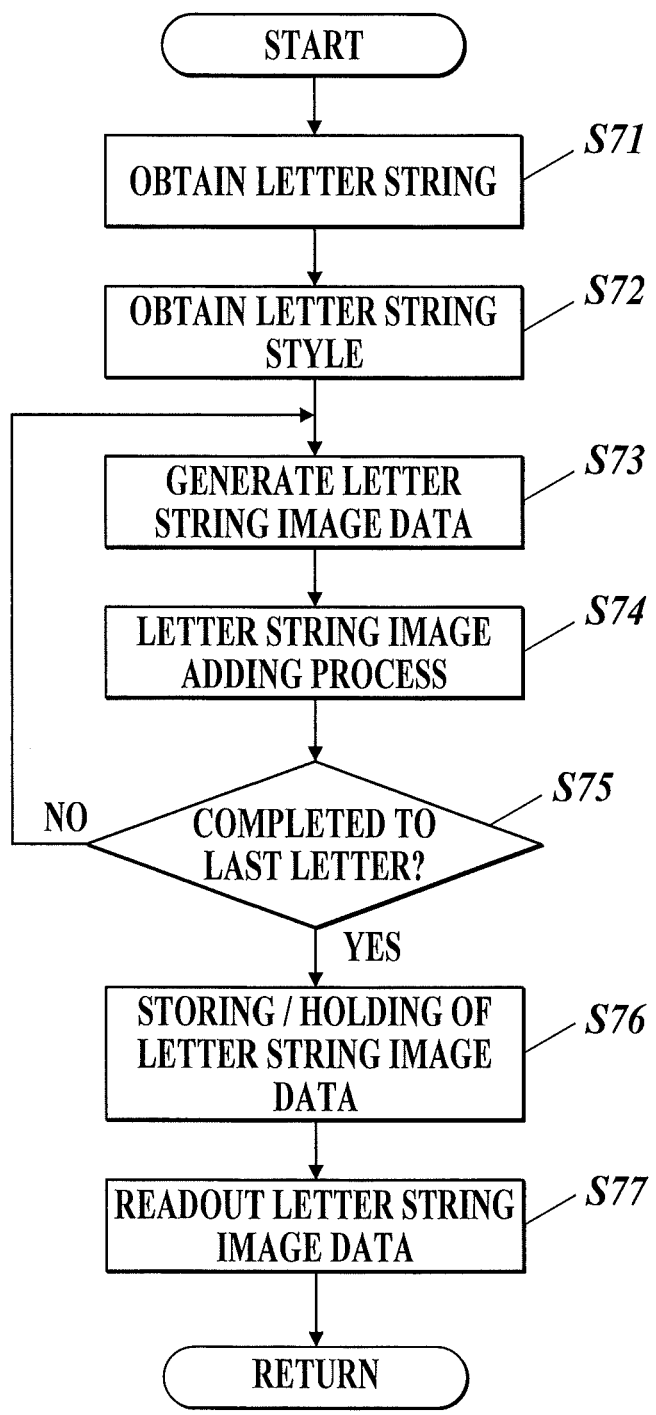
FIG. 19 is a flowchart showing a flow of a letter string image generation/reading process.

In FIG. 19, a flow of the letter string image generation/reading process is shown.

First, the letter string image generation unit P12 obtains a letter string (step S71). The letter string which is to be obtained in step S71 is the letter string which is set in "Characters" of the tint block editing screen D2. When "<Custom>" is selected in "Characters", an arbitrary letter string which is inputted to the text box T1 is to be obtained.

Next, the letter string image generation unit P12 obtains a letter string style (step S72). The letter string style is the figuration of the letters according to the font set in "Font Name" and the size of the letters set in "Text Size" in the tint block editing screen D2.

Next, the letter string image generation unit P12 generates letter string image data according to the letter string style which is obtained in step S72 for the first letter among the letter string obtained in step S71 in which the letter string image is not yet generated (step S73).

Next, the letter string image generation unit P12 carries out the letter string image adding process (step S74). The letter string image adding process is a process to combine the letter string image data which is generated in step S73 so as to be arranged adjacent in the right side of the last letter string image data which is already generated as the letter string image among the letter string obtained in step S71. When the letter string image data which is generated in step S73 is the letter string image data corresponding to the first letter of the letter string obtained in step S71, the process of step S74 can be omitted.

Next, the letter string image generation unit P12 determines whether generation of letter string image data is completed to the last letter of the letter string obtained in step S71 or not (step S75). When the generation of letter string image data is not completed to the last letter (step S75: NO), the process returns to step S73.

When the generation of letter string image data is completed to the last letter of the letter string obtained in step S71 in step S75 (step S75: YES), the letter string image generation unit P12 makes the image holding unit P11 store and hold the generated letter string image data (step S76).

Then, the tint block image generation unit P13 reads out the letter string image data which is stored in step S76 (step S77). With the above process, the letter string image generation/reading process is finished.

After step S54 of FIG. 18 and the letter string image generation/reading process shown in FIG. 19 are finished, the tint block image generation unit P13 reads out the pattern image data to generate combined image data by combining the read out pattern image data with the letter string image data which is obtained in step S54 (step S55). The pattern image data which is read out in association with the process of step S55 corresponds to the setting of "Background Pattern" in the tint block editing screen D2.

Similarly, the tint block image generation unit P13 combines the reversed letter string image data in which the letter string image data is reversed and the pattern image data.

The tint block image generation unit P13 generates the remaining image data by combining the image data for forming the remaining pattern which is obtained in step S52 with either one of the combined image data obtained in step S55 or the image data in which the reversed letter string image data and the pattern image data are combined (step S56). Determination of which of the combined image data or the image data in which the reversed letter string image data and the pattern image data are combined is to be combined with the remaining pattern corresponds to the setting item of "Pattern" in the tint block editing screen D2.

The tint block image generation unit P13 generates the disappearing image data by combining the image data for forming the disappearing pattern which is obtained in step S53 with either of the combined image data obtained in step S55 or the image data in which the reversed letter string image data and the pattern image data are combined which was not used for generating the remaining image data (step S57). Determination of which of the combined image data or the image data in which the reversed letter string image data and the pattern image data are combined is to be combined with the disappearing pattern corresponds to the setting item of "Pattern" in the tint block editing screen D2.

The order of the generation process of the remaining image data in step S56 and the generation process of the disappearing image data in step S57 is a random order and can be changed arbitrarily. Further, generation of the combined image data for either of the remaining image data or the disappearing image data or generation of the image data in which the reversed letter string image data and the pattern image data are combined and generation of the remaining image data or the disappearing image data based on the above generated image data may be carried out, and thereafter, generation of the other of the above, respectively, may be carried out.

The tint block image generation unit P13 generates tint block image data by combining the remaining image data obtained in step S55 and the disappearing image data obtained in step S56 (step S58). With the above process, the tint block image generation process is finished.

The order of the tint block image generation process and the job starting process is a random order, and can be changed arbitrarily.

After step S5 of FIG. 17 and the tint block image generation process shown in FIG. 18 are finished, the page description data generation unit P14 carries out the generation and description process of the tint block image definition 35 (step S6). The page description data generation unit P14 generates the tint block image definition 35 and carries out the description of the tint block image definition 35 after the description of "$Header" of the page description data 30. The color setting of the tint block image based on the setting of "Text/Background Color" in the tint block editing screen D2 is reflected in the tint block image definition 35.

The page description data generation unit P14 carries out the page start process for the first page among the pages in which the description to the page description data 30 is not yet finished (step S7). The page start process is a process for carrying out the description of "%StartPage" of the page description data 30.

After the page start process of step S7, the page description data generation unit P14 carries out the process for adding the command for carrying out the forming of the tint block image to the page description data 30 (step S8) and the page data process (step S9). The page data process is a process for generating and describing the script for rendering the image other than the tint block image of each page. The order for carrying out the adding process of the command for carrying out the forming of the tint block image of step S8 and the page data process of step S9 corresponds to the setting of "Pattern Overwrite" in the tint block editing screen D2. When the setting of "Pattern Overwrite" is set to "Back", the above processes are to be carried out in the order of step S8 and then step S9. When the setting of "Pattern Overwrite" is set to "Front", the above processes are to be carried out in the order of step S9 and then step S8.

After steps S8 and S9 are completed, the page description data generation unit P14 carries out the description of "$EndPage".

After the processes of steps S8 and S9, the page description data generation unit P14 determines whether the generation of the command for carrying out the forming of the tint block image, the description process and the page data process are completed to the last page or not (step S10). When the processes are not completed to the last page in step S10 (step S10: NO), the process returns to the process of step S7.

When the processes are completed to the last page in step S10 (step S10: YES), the page description data generation unit P14 carries out the job finishing process (step S11). The job finishing process is a process to carry out description of "%EndPDL" and "%EndJOb".

After the job finishing process of step S11, the printer driver completes the generation of the print job (step S12) and transmits the print job to the image forming apparatus 4 (step S13). With the above process, the process carried out by the printer driver is finished.

When the tint block print setting is turned OFF due to the check box C1 of the "Copy Protect" not being checked by a user via the input unit 16 in step S2 (step S2: NO), the tint block image will not be formed in the printings thereafter.

When printing is instructed (step S3: YES) in a state where the tint block print setting is OFF (step S2: NO), the print driver carries out the job starting process (step S4), the page start process (step S7), the page data process (step S9), the determination of whether the process is completed to the last page or not (step S10), the job finishing process (step S11), completing of the print job creating (step S12) and the transmission of the print job (step S13).

According to the first embodiment, the printer driver generates the tint block image data and generates the script for forming the tint block image from the tint block image data, adds the script to the print data and inputs the print job which includes the print data to which the script for forming the tint block image is added to the image forming apparatus 4. The image forming apparatus 4 forms the tint block image according to the script which is added to the print data on the paper. Thereby, forming of the tint block image can be carried out by using a general print data process such as analyzing and rasterizing the print job without the tint block print function of a dedicated hardware being provided to the image forming apparatus 4. Therefore, an image forming apparatus which can carry out the tint block printing and which is low cost can be provided.

Moreover, the tint block image which is generated by the printer driver is inputted to the image forming apparatus 4 in a script format. Therefore, the data amount to be transmitted can be reduced greatly comparing to the case where the tint block image data itself being inputted to the image forming apparatus 4 from the computer 3.

Further, the printer driver carries out an object definition of the tint block image definition 35 and adds the command for carrying out the forming of the tint block image to each page. The image forming apparatus 4 invokes an object of the tint block image definition 35 by the command for carrying out the forming of the tint block image which is set in each page to form the tint block image which is to be printed in each page. In such way, by carrying out the object definition of the tint block image, there is no need to individually define the script for forming the tint block image to each page, and the data amount to be added for the tint block image forming can be reduced greatly comparing to the case where the script for forming the tint block image to each page is individually defined.

Furthermore, the tint block image includes the remaining pattern and the disappearing pattern. By forming the tint block image including both of the remaining pattern and the disappearing pattern on the paper before copying, the tint block image which is formed on the paper before copying can be made to be obscure comparing to the case where the tint block image is formed only by the remaining pattern.

Moreover, regarding an arbitrary letter string which is inputted in the text box T1 by a user, the letter string image generation unit P12 generates the letter string image and the tint block image generation unit P13 generates the tint block image based on the letter string image which is generated by the letter string image generation unit P12, the pattern image data and the image data for forming the remaining pattern and the disappearing pattern which are stored, managed and held by the image holding unit P11. In such way, the tint block image corresponding to an arbitrary letter string can be formed.

Further, the size of the letters to be formed as the tint block image can be set. Therefore, the tint block image more flexibly corresponding to an arbitrary letter string can be formed.

Furthermore, color of the tint block image which is to be formed on a paper can be set. Therefore, an arbitrary tint block image can be formed more flexibly.

Moreover, the script for forming the tint block image is PDL. Therefore, forming of the tint block image by the printer driver can be carried out by number of image forming apparatuses which can decipher PDL.

Here, in the embodiment of the present invention, all of the aspects of the embodiment described here are examples and are not limitative. The scope of the present invention is indicated by the claims an not by the above description and all changes equivalent and within the scope of the claims are included.

For example, in the above described embodiment, the object definition by the tint block image definition 35 is carried out in the header of the page description data 30 and the command for carrying out the forming of the tint block image is inserted in each page. However, a script for forming the tint block image can be described in each page.

In FIG. 20, an example of the page description data 30 in a case where a script for forming the tint block image is described in each page is shown.

For example, as shown in FIG. 20, the script for forming the tint block image may be described individually after the description of "$StartPage" of each page by carrying out the description similar to what is in the parenthesis (< >) of the above tint block image definition 35. In the example shown in FIG. 20, the script for forming the tint block image is described before the script for forming the image other than the tint block image. However, the order can be changed arbitrarily as in the changing of description order according to the setting of "Pattern Overwrite" described above, for example.

By describing a script for forming the tint block image in each page, the tint block image can be formed even in the image forming apparatus which cannot handle the data to which the object definition is carried out.

Further, a script for carrying out an image quality setting according to the tint block image can be further added in order to form the tint block image more preferably. Hereinafter, the description of script for carrying out an image quality setting according to the tint block image is described as "image quality setup description", and an embodiment of a case where the image quality setup description is further added will be described as the second embodiment. The second embodiment includes all of the structures of the first embodiment.

Figure 21:
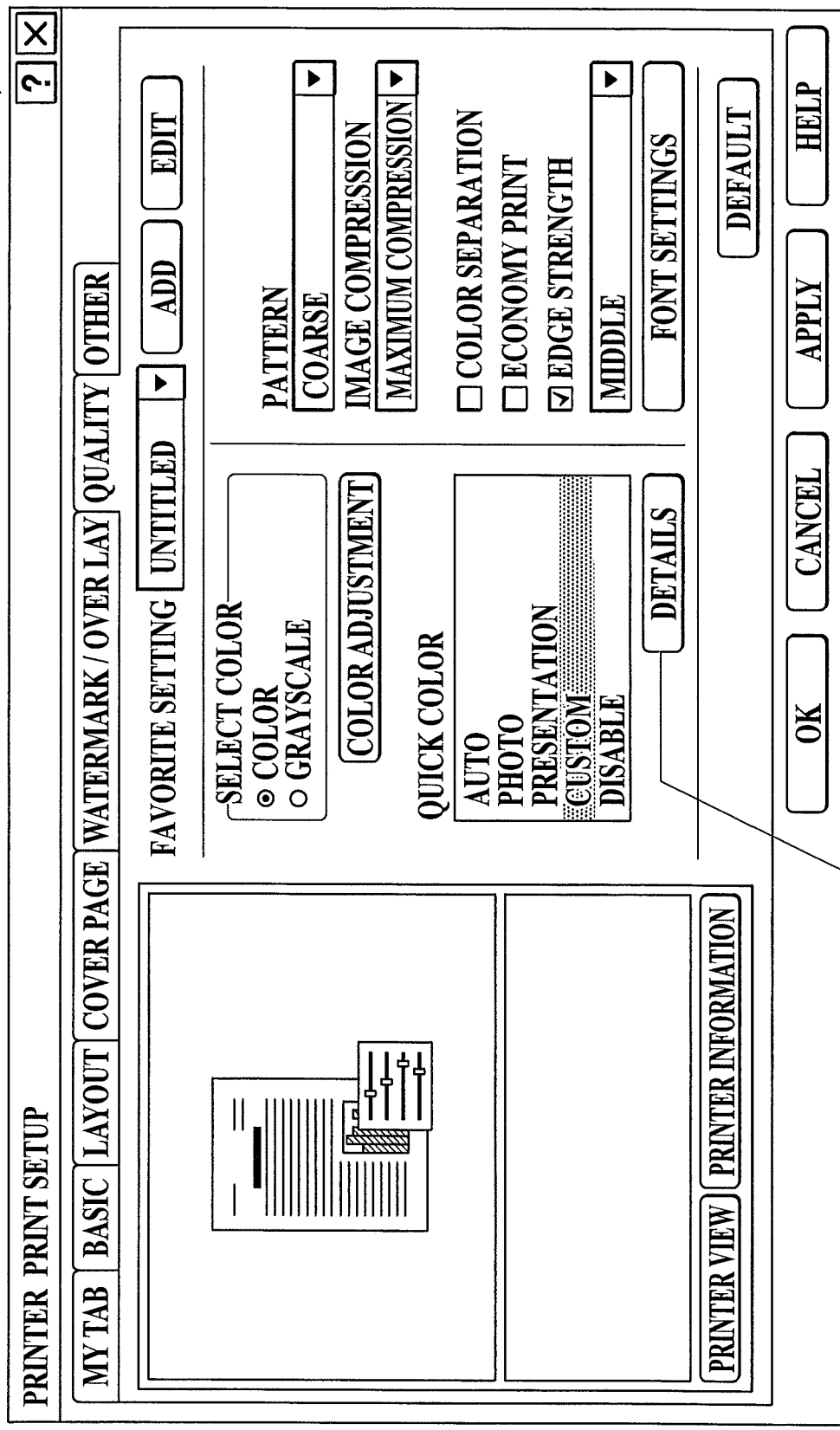
FIG. 21 is an example of an image quality setup screen.

In FIG. 21, an example of the image quality setup screen D3 is shown.

The image quality setup screen D3 is one of setup screens. By the input operation to the image quality setup screen D3, setting of image quality in the image forming can be carried out.

In the setting of "Quick Color" in the image quality setup screen D3 shown in FIG. 21, the image quality setting by the color setup screen D4 can be carried out when the "Details" button B1 which is provided below "Custom" is clicked in a state where "Custom" is selected.

Figure 22:
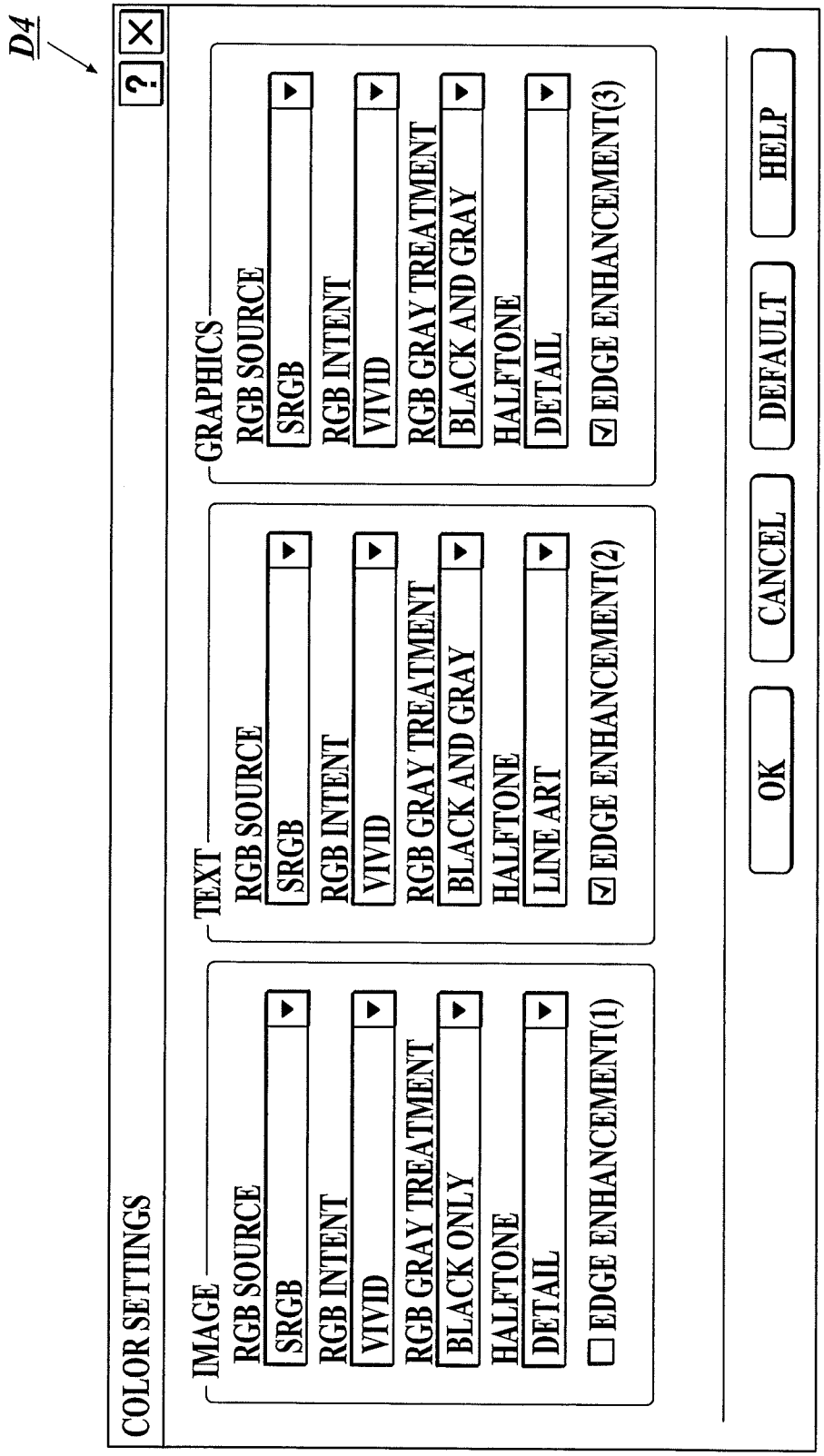
FIG. 22 is an example of a color setup screen.

In FIG. 22, an example of the color setup screen D4 is shown.

The color setup screen D4 is one of setup screens. By the input operation to the color setup screen D4, color setting can be carried out individually for Image, Text and Graphics which are elements structuring various types of images. The color setting items provided for each of Image, Text and Graphics are similar. Therefore the color setting items will be described collectively.

Among the color setting items, "RGB Intent" is a setting item relating to RGB color conversion. The setting relating to RGB color conversion is a setting for assigning color conversion characteristics when carrying out color conversion to color reproduction by coloring materials of the image forming apparatus 4 (for example, CMYK and the like) from the RGB parameter of the image data which is inputted to the image forming apparatus 4.

As for "RGB Intent", either "Vivid" or "Photographic" is to be set. "Vivid" is a setting indicating a condition being "bright" and is a setting for carrying out color reproduction in which saturation of the image is maintained or emphasized. "Photographic" is a setting indicating a condition being "photograph mode" and is a setting for carrying out color reproduction in which relative relation of colors included in the image is maintained.

Among the color setting items, "RGB Gray Treatment" is a setting item relating to RGB gray reproduction. The setting relating to RGB gray reproduction is a setting relating to reproduction of black and gray among the colors included in the image.

As for "RGB Gray Treatment", either one of "Composite Black", "Black Only" or "Black and Gray" is to be set. "Composite Black" is a setting for reproducing black and gray with all of the coloring materials (for example, four colors of CMYK). "Black Only" is a setting for reproducing black (R=G=B=0) with only the coloring material of black and for reproducing gray with all of the coloring materials (for example, four colors of CMYK). "Black and Gray" is a setting for reproducing black and gray with only the coloring material of black.

When forming a tint block image and when the colors forming the tint block image is cyan (C) or magenta (M), the tint block image can be formed preferably by carrying out the color reproduction in which saturation of the image is maintained or emphasized. In case of the second embodiment, when the check box C1 of "Copy Protect" in the print setup screen D1 is checked and when "Cyan" or "Magenta" is set for "Text/Background Color" in the tint block editing screen D2, the tint block image can be formed preferably when "Vivid" is set for the setting of "RGB Intent".

Moreover, when forming the tint block image regardless of the color which forms the tint block image, the tint block image can be formed preferably by reproducing black and gray with only the coloring material of black. In case of the second embodiment, when the check box C1 of "Copy Protect" in the print setup screen D1 is checked and when "Black and Gray" is set for the setting of "RGB Gray Treatment", the tint block image can be formed preferably.

In case of color setting other than the above color settings, there may be cases where the tint block image cannot be formed preferably. For example, when the tint block image which is not formed preferably is copied, there may be cases where the tint block image is not formed on the paper after copying and where the tint block image is formed but not formed clearly.

Moreover, a user is not necessarily carrying out the image quality setting by being conscious about preferably forming the tint block image. For example, when "Auto" is selected in "Quick Color" in the image quality setup screen D3, "Photographic" is assumed for the setting of "RGB Intent" in the color setup screen D4 and the setting of "RGB Intent" will be handled as "Composite Black". Therefore, there may be a case where printing might be carried out by the image quality setting which is not preferable for forming the tint block image although instruction for forming the tint block image is instructed.

In view of the above problems, the printer driver of the second embodiment carries out determination with regards to the image quality setting and adds a command for changing the image quality setting to the image quality setting according to the tint block image based on the determination result to the print job.

In FIG. 23, an example of the job control description including the image quality setup description 40 is shown.

The image quality setup description 40 shown in FIG. 23 is included in the job control description. The description of "RGBGrayTreatmen=BlcackAndGray" in the image quality setup description 40 is a command to set "Black and Gray" for the setting of "RGB Gray Treatment". The description of "RGBIntent=Vivid" in the image quality setup description 40 is a command to set "Vivid" for the setting of "RGB Intent".

The image quality setup description 40 is described by the image quality setup changing unit P15 of the printer driver.

Figure 24:
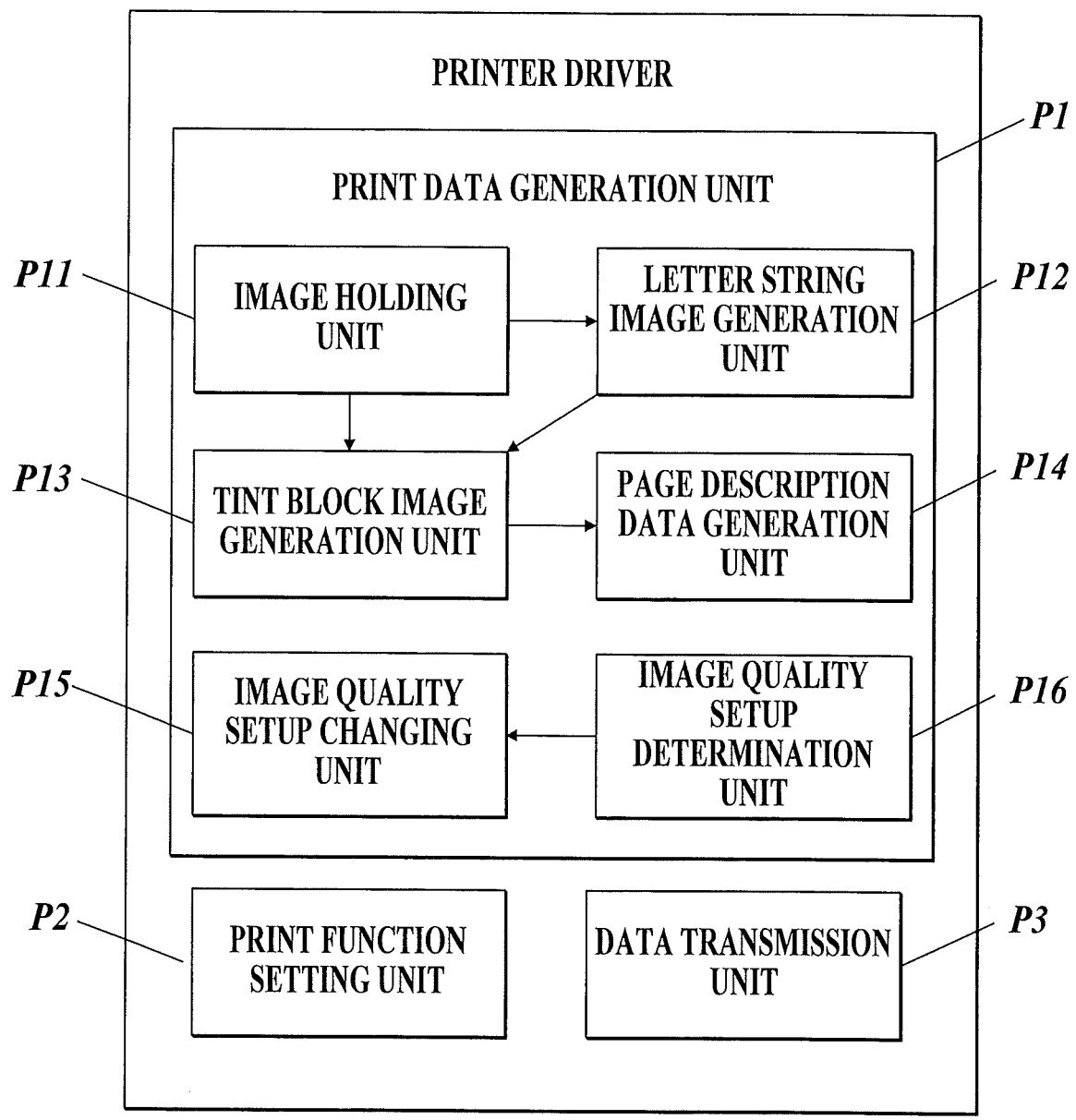
FIG. 24 is a functional block diagram of a printer driver of the second embodiment.

In FIG. 24, a functional block diagram of the printer driver of the second embodiment is shown.

The printer driver of the second embodiment includes the image quality setup changing unit P15 and the image quality setup determination unit P16 in addition to the structure of the printer driver of the first embodiment. The image quality setup changing unit P15 and the image quality setup determination unit P16 of the second embodiment are included in the print data generation unit P1.

The image quality setup changing unit P15 generates the image quality setup description 40 and adds the generated image quality setup description 40 to the job control description.

The image quality setup determination unit P16 carries out determination with regards to image quality setting.

The image quality setup determination unit P16 carries out the determination by the following formulas (1) and (2).

$$\text{(CopyProtect==ON) \& (RGBGrayTreatment !=BlackAndGray)->RGBGrayTreatment=BlackAndGray} \quad (1)$$

$$\text{(CopyProtect==ON) \& ((CopyProtectColor==Magenta)|(CopyProtectColor==Cyan)) \& (RGBIntent !=Vivid)->RGBIntent=Vivid} \quad (2)$$

(CopyProtect==ON) of the formulas (1) and (2) is a criterion formula which becomes true when the tint block print function is ON and which becomes false when the tint block print function is not ON.

(RGBGrayTreatment !=BlackAndGray) of the formula (1) is a criterion formula which becomes true when the setting of "RGB Gray Treatment" in the color setup screen D4 is not set to "Black and Gray" and which becomes false when the setting of "RGB Gray Treatment" in the color setup screen D4 is set to "Black and Gray".

RGBGrayTreatment=BlackAndGray of the formula (1) is a command to set "Black and Gray" for the setting of "RGB Gray Treatment" in the color setup screen D4.

The formula (1) is a formula to set "Black and Gray" for the setting of "RGB Gray Treatment" in the color setup screen D4 when the tint block print function is ON and the setting of "RGB Gray Treatment" in the color setup screen D4 is not set the "Black and Gray".

((CopyProtectColor==Magenta)| (CopyProtectColor==Cyan)) of the formula (2) is a criterion formula which becomes true when "Magenta" or "Cyan" is set for the setting of "Text/Background Color" in the color setup screen D4 and which becomes false when "Magenta" or "Cyan" is not set for the setting of "Text/Background Color" in the color setup screen D4.

(RGBIntent !=Vivid) of the formula (2) is a criterion formula which becomes true when "Vivid" is not set for the setting of "RGB Intent" in the color setup screen D4 and which becomes false when "Vivid" is set for the setting of "RGB Intent" in the color setup screen D4.

RGBIntent=Vivid of the formula (2) is a command to set "Vivid" for the setting of "RGB Intent" in the color setup screen D4.

The formula (2) is a formula to set "Vivid" for the setting of "RGB Intent" in the color setup screen D4 when the tint block print function is ON, "Magenta" or "Cyan" is set for the setting of "Text/Background Color" in the color setup screen D4 and "vivid" is set for the setting of "RGB Intent" in the color setup screen D4.

With regards to the setting which is carried out by the printer driver, when it is determined that the tint block print function is ON and that "Black and Gray" is not set for the setting of "RGB Gray Treatment" in the color setup screen D4 by the formula (1), the image quality setup determination unit P16 makes the image quality setup changing unit P15 generate and describe a command to set "Black and Gray" for the setting of "RGB Gray Treatment" in the color setup screen D4. The command to set "Black and Gray" for the setting of "RGB Gray Treatment" in the color setup screen D4 which is generated and described by the image quality setup changing unit P15 is the description of "RGBGray Treatment=BlackAndGray" in the image quality setup description 40.

With regards to the setting which is carried out by the printer driver, when it is determined that the tint block print function is ON, that "Magenta" or "Cyan" is set for the setting of "Text/Background Color" in the color setup screen D4 and that "Vivid" is not set for the setting of "RGB Intent" in the color setup screen D4 by the formula (2), the image quality setup determination unit P16 makes the image quality setup changing unit P15 generate and describe a command to set "Vivid" for the setting of "RGB Intent" in the color setup screen D4. The command to set "Vivid" for the setting of "RGB Intent" in the color setup screen D4 which is generated and described by the image quality setup changing unit P15 is the description of "RGBIntent=Vivid" in the image quality setup description 40.

The determination by the formulas (1) and (2) and the generation and description of the commands are to be processed individually. For example, when it applies to the formula (1) but not to formula (2), the contents of the image quality setup description 40 will be only one line of "RGBGrayTreatment=BlackAndGray".

The image quality setting by the image quality setup description 40 is prioritized over the image quality setting which is set by the input operation of a user via various types of setup screens. When the image quality setup description 40 is included in the print job, the image forming apparatus 4 carries out image forming according to the image quality setup assigned by the image quality setup description 40.

Here, the tint block image of the embodiment belongs to Image among Image, Text and Graphics which are elements structuring various types of images. In the above described embodiment, changing of image quality setup is carried out by the image quality setup description 40 for the image quality setup of all of Image, Text and Graphics. However, changing of image quality setup corresponding to the tint block image is sufficient when the changing is carried out only for the image quality setup of Image. Therefore, the image quality setup which is to be changed by the image quality setup description 40 may be only the image quality setup of Image.

Next, a flow of the process carried out by the printer driver in the second embodiment will be described by sing the flowchart of FIG. 25.

Figure 25:
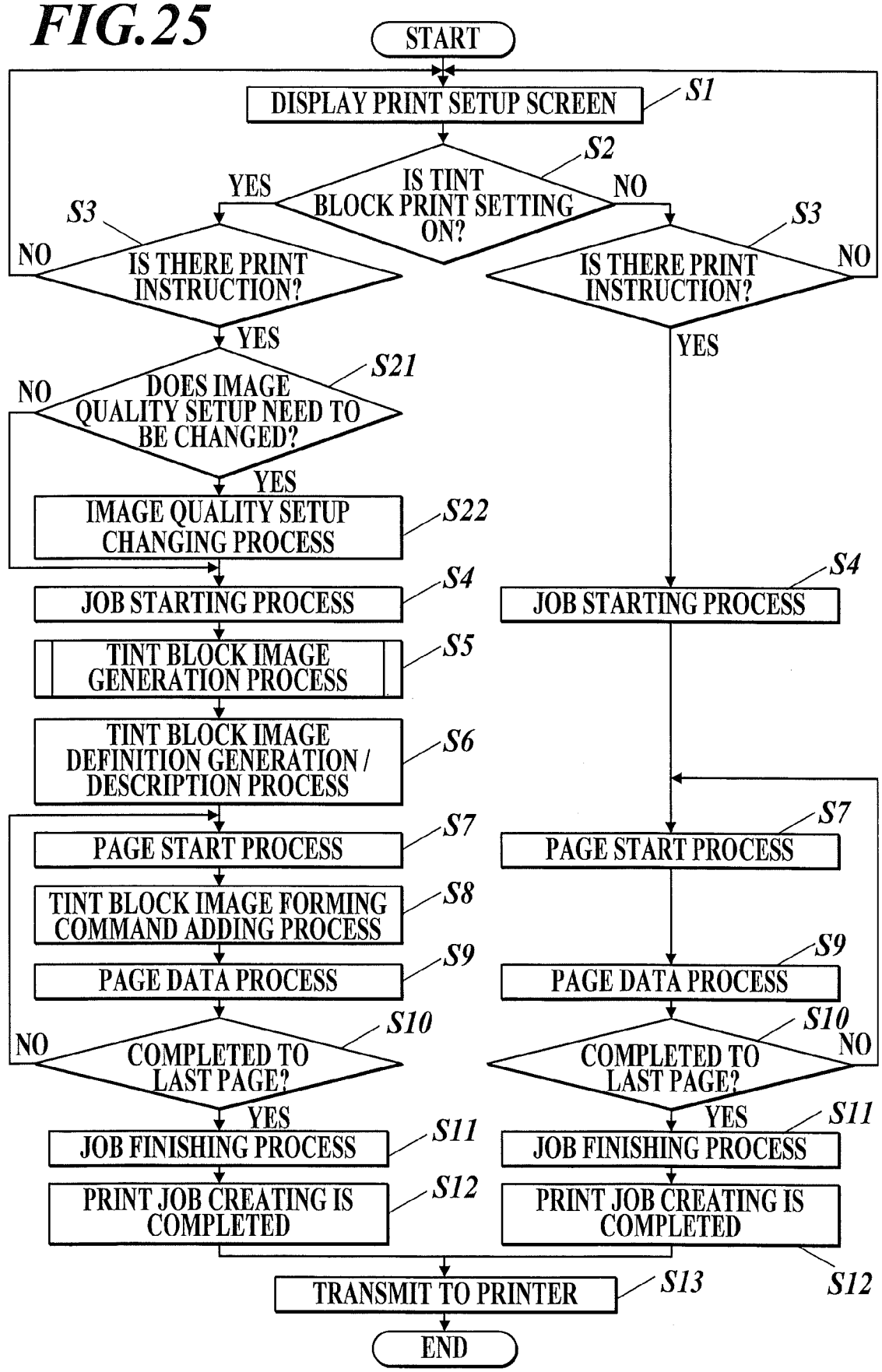
FIG. 25 is a flowchart showing a flow of a process carried out by the printer driver of the second embodiment.

As shown in FIG. 25, in the process carried out by the printer driver in the second embodiment, a determination whether the image quality setup needs to be changed or not (step S21) is carried out after the instruction of printing in step S3 (step S3: YES) and before carrying out the job starting process of step S4. When the image quality setup needs to be changed (step S21: YES), the image quality setup changing process is carried out (step S22).

The determination of whether the image quality setup needs to be changed or not of step S21 is a determination of image quality setup by the formulas (1) and (2). When the setup which is set by the input operation of a user via various types of setup screens of the printer driver fulfills at least either one of the formulas (1) or (2), the image quality setup determination unit P16 determines that the image quality setup needs to be changed (step S21: YES). When the setup which is set by the input operation of a user does not fulfill either one of the formulas (1) and (2), the image quality setup determination unit P16 determines that the image quality setup does not need to be changed (step S21: NO), and the process by the printer driver moves to the job starting process of step S4 when the image quality setup does not need to be changed (step S21: NO).

The image quality setup changing process of step S22 is a process to generate the image quality setup description 40 for carrying out the command corresponding to either of the determination of the formula (1) or (2) in which the condition is fulfilled in the determination of step S21. The image quality setup description 40 which is generated in step S22 is described so as to be included in the job control description in the job starting process of step S4 thereafter.

The flow of the process carried out by the printer driver of the second embodiment is similar to the printer driver of the first embodiment except that steps S21 and S22 are carried out and that the image quality setup description 40 is further described in the job starting process of step S4.

According to the second embodiment, by further adding the script for carrying out the image quality setup according to the tint block image, the tint block image can be formed more preferably in addition to the advantages of the first embodiment. In addition, even when a user forgets to set the image quality setup for preferably forming the tint block image or when a user does not know the image quality setup for preferably forming the tint block image, the image quality setup is automatically changed by the script for carrying out the image quality setup according to the tint block image. Therefore, forming of the tint block image by the image quality setup according to the tint block image can be carried out surely.

The determination contents of formulas (1) and (2) and the specific contents of the image quality setup according to the tint block image in the second embodiment are only an example, and they can be changed arbitrarily.

The structure of computer, color space, number of colors and other various types of items handled by the printer driver and the image forming apparatus can be changed arbitrarily.

In the above description, an example where a ROM is used as the computer readable medium of the program according to the present invention is described. However, the present invention is not limited to the example. As for other computer readable medium, a non-volatile memory such as a flash memory and the like, a portable recording medium such as CD-ROM and the like can be applied.

Further, as a medium for providing data of the program according to the present invention via a communication circuit, a carrier wave is applied in the present invention.

According to an aspect of the preferred embodiment of the present invention, a computer readable storage medium storing a program makes a computer realize functions of an image storage unit to store image data for generating a tint block image, a tint block image generation unit to generate the tint block image based on the image data, a script generation unit to generate a script for forming the tint block image based on the tint block image generated by the generation unit, a script adding unit to add the script to print data and a print data input unit to input the print data in which the script is added by the adding unit to an image forming apparatus.

According to the embodiment, forming of the tint block image can be carried out by using a general print data process such as deciphering and rasterizing the print job without the tint block print function of a dedicated hardware being provided to the image forming apparatus 4. Therefore, an image forming apparatus which can carry out the tint block printing and which is low cost can be provided.

Moreover, the tint block image which is generated by the printer driver is inputted to the image forming apparatus 4 in a script format. Therefore, the data amount to be transmitted can be reduced greatly comparing to the case where the tint block image data itself being inputted to the image forming apparatus 4 from the computer 3.

According to the aspect of the preferred embodiment of the present invention, the computer readable storage medium storing the program makes the computer realize functions of a defining unit to define the script for forming the tint block image as an object and a command adding unit to add an invoking command for invoking the object which is defined by the defining unit to each page of the print data.

According to the embodiment, by carrying out the object definition of the tint block image, there is no need to individually define the script for forming the tint block image to each page, and the data amount to be added for the tint block image forming can be reduced greatly comparing to the case where the script for forming the tint block image is individually defined to each page.

According to the aspect of the preferred embodiment of the present invention, the tint block image comprises a remaining pattern which is visually recognizable in an image which is copied when a copying by an optical processing is carried out to the tint block image formed on a paper and a disappearing pattern which is not visually recognizable in the image which is copied when the copying by the optical processing is carried out to the tint block image formed on the paper.

According to the embodiment, the tint block image includes the remaining pattern and the disappearing pattern. By forming the tint block image including both of the remaining pattern and the disappearing pattern on the paper before copying, the tint block image which is formed on the paper before copying can be made to be obscure comparing to the case where the tint block image is formed only by the remaining pattern.

According to the aspect of the preferred embodiment of the present invention, the computer readable storage medium storing the program makes the computer realize functions of a letter string input unit to input a letter string formed of one or a plurality of letters, a letter string image generation unit to generate a letter string image according to the letter string and a tint block image generation unit to generate the tint block image based on the letter string image and the image data.

According to the embodiment, the tint block image corresponding to an arbitrary letter string can be formed.

According to the aspect of the preferred embodiment of the present invention, the computer readable storage medium storing the program makes the computer realize a function of a first setting unit to set at least either one of a font of the letters or a size of the letter string image.

According to the embodiment, the size of the letters to be formed as the tint block image can be set. Therefore, the tint block image more flexibly corresponding to an arbitrary letter string can be formed.

According to the aspect of the preferred embodiment of the present invention, the computer readable storage medium storing the program makes the computer realize a function of a second setting unit to set a color of the tint block image.

According to the embodiment, the size of the letters to be formed as the tint block image can be set. Therefore, the tint block image more flexibly corresponding to an arbitrary letter string can be formed.

According to the aspect of the preferred embodiment of the present invention, the script is a page description language.

According to the embodiment, the script for forming the tint block image is PDL. Therefore, forming of the tint block image by the printer driver can be carried out by number of image forming apparatuses which can decipher PDL.

According to another aspect of the preferred embodiment of the present invention, there is provided an image forming apparatus including an image storage unit to store image data for generating a tint block image and a control unit to generate the tint block image based on the image data, to generate a script for forming the tint block image based on the generated tint block image, to add the script to print data and to input the print data in which the script is added to the image forming apparatus.

According to the embodiment, forming of the tint block image can be carried out by using a general print data process such as deciphering and rasterizing the print job without the tint block print function of a dedicated hardware being provided to the image forming apparatus 4. Therefore, an image forming apparatus which can carry out the tint block printing and which is low cost can be provided.

Moreover, the tint block image which is generated by the printer driver is inputted to the image forming apparatus 4 in a script format. Therefore, the data amount to be transmitted can be reduced greatly comparing to the case where the tint block image data itself being inputted to the image forming apparatus 4 from the computer 3.

According to further another aspect of the preferred embodiment of the present invention, there is provided an image processing method including storing image data for generating a tint block image, first generating the tint block image based on the image data, second generating a script for forming the tint block image based on the tint block image generated by the first generating, adding the script to print data and inputting the print data in which the script is added by the adding to the image forming apparatus.

According to the embodiment, forming of the tint block image can be carried out by using a general print data process such as deciphering and rasterizing the print job without the tint block print function of a dedicated hardware being provided to the image forming apparatus 4. Therefore, an image forming apparatus which can carry out the tint block printing and which is low cost can be provided.

Moreover, the tint block image which is generated by the printer driver is inputted to the image forming apparatus 4 in a script format. Therefore, the data amount to be transmitted can be reduced greatly comparing to the case where the tint block image data itself being inputted to the image forming apparatus 4 from the computer 3.

The present U.S. patent application claims a priority under the Paris Convention of Japanese paten application No. 2009-267002 filed on Nov. 25, 2009, which shall be a basis of correction of an incorrect translation.

What is claimed is:

1. A non-transitory computer readable storage medium storing a program which, when executed, causes a computer to realize functions of:
   a tint block image generation unit to generate the a tint block image based on image data stored in an image storage unit;
   a script generation unit to generate a script for forming the tint block image based on the tint block image generated by the generation unit;
   a defining unit to define the script for forming the tint block image as an object;
   a script adding unit to add the defined script to print data;
   a command adding unit to add an invoking command, for invoking the object, to the print data; and
   a print data input unit to input the print data, to which the script and the invoking command have been added, to an image forming apparatus.

2. The computer readable storage medium storing the program of claim 1, wherein
   the command adding unit adds the invoking command to each page of the print data.

3. The non-transitory computer readable storage medium storing the program of claim 1, wherein
   the tint block image comprises a remaining pattern which is visually recognizable in an image which is copied when a copying by an optical processing is carried out to the tint block image formed on a paper and a disappearing pattern which is not visually recognizable in the image which is copied when the copying by the optical processing is carried out to the tint block image formed on the paper.

4. The non-transitory computer readable storage medium storing the program of claim 1, wherein the program further causes the computer to realize functions of:
   a letter string input unit to input a letter string formed of one or a plurality of letters; and
   a letter string image generation unit to generate a letter string image according to the letter string;
   and wherein the tint block image generation unit generates the tint block image based on the letter string image and the image data.

5. The non-transitory computer readable storage medium storing the program of claim 4, wherein the program further causes the computer to realize a function of a first setting unit to set at least either one of a font of the letters or a size of the letter string image.

6. The non-transitory computer readable storage medium storing the program of claim 1, wherein the program further causes the computer to realize a function of a second setting unit to set a color of the tint block image.

7. The non-transitory computer readable storage medium storing the program of claim 1, wherein the script is a page description language.

8. A computer configured to be connected via a network to an image forming apparatus, comprising:
   a memory to store image data for generating a tint block image; and
   a processor, wherein the processor executes the steps of:
   storing image data for generating a tint block image,
   generating the tint block image based on the stored image data,
   generating a script for forming the tint block image based on the generated tint block image,
   defining the script for forming the tint block image as an object,
   adding the defined script to print data,
   adding an invoking command, for invoking the object, to the print data, and
   inputting the print data, to which the script and the invoking command have been added, to the image forming apparatus.

9. The computer of claim 8, wherein the invoking command is added to each page of the print data.

10. An image processing method, comprising:
    storing image data for generating a tint block image;
    generating the tint block image based on the stored image data;
    generating a script for forming the tint block image based on the generated tint block image;
    defining the script for forming the tint block image as an object;
    adding the defined script to print data;
    adding an invoking command, for invoking the object, to the print data; and
    inputting the print data, to in which the defined script and the invoking command have been added, to the image forming apparatus.

11. The image processing method of claim 10, wherein the invoking command is added to each page of the print data.

* * * * *